United States Patent
Nakamura

(10) Patent No.: US 7,912,370 B2
(45) Date of Patent: Mar. 22, 2011

(54) OPTICAL POWER MEASUREMENT APPARATUS AND OPTICAL POWER MEASUREMENT METHOD

(75) Inventor: Kentaro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 11/940,773

(22) Filed: Nov. 15, 2007

(65) Prior Publication Data

US 2008/0131116 A1    Jun. 5, 2008

(30) Foreign Application Priority Data

Nov. 30, 2006   (JP) ................................. 2006-323450

(51) Int. Cl.
*H04B 10/08* (2006.01)
*H04B 10/02* (2006.01)

(52) U.S. Cl. .............................. 398/38; 398/33; 398/177

(58) Field of Classification Search .................... 398/34, 398/38, 37, 25, 33, 97, 177
See application file for complete search history.

(56) References Cited

U.S. PATENT DOCUMENTS

| 6,160,649 | A  | * | 12/2000 | Horiuchi et al. ............... 398/34 |
| 6,654,561 | B1 |   | 11/2003 | Terahara et al. |
| 7,218,859 | B2 | * | 5/2007  | Bethea .......................... 398/102 |
| 7,489,876 | B2 | * | 2/2009  | Fujita et al. ................... 398/177 |
| 7,680,419 | B2 | * | 3/2010  | Nakashima et al. .......... 398/177 |

FOREIGN PATENT DOCUMENTS

JP   2001-203414   7/2001

* cited by examiner

*Primary Examiner* — M. R. Sedighian
(74) *Attorney, Agent, or Firm* — Staas & Halsey LLP

(57) ABSTRACT

An apparatus provides measurement of power of an optical signal transmitted in a wavelength multiplexing scheme, based on the optical spectrum and the information on the optical signal. A method provides measuring the power of an optical signal transmitted in a wavelength multiplexing scheme based on the optical spectrum of the optical signal and information acquired on the optical signal.

19 Claims, 28 Drawing Sheets

FIG. 14

| CH2 \ CH4 | OFF | 10G | 40G |
|---|---|---|---|
| OFF | 0.0 | −0.7 | −0.8 |
| 10G | −0.7 | −1.1 | −1.2 |
| 40G | −0.8 | −1.2 | −1.3 |

(UNIT dB)

US 7,912,370 B2

OPTICAL POWER MEASUREMENT APPARATUS AND OPTICAL POWER MEASUREMENT METHOD

BACKGROUND OF THE INVENTION

1. Field of the Invention

The present invention relates to an optical power measurement apparatus and an optical power measurement method for measuring the power of an optical signal in a WDM communication system.

2. Description of the Related Art

To fulfill the requirement for an increased capacity of a backbone communication network in response to the increase in communication traffic in recent years, there is commercialized a WDM (Wavelength Division Multiplexing) communication system having a transmission rate of 10 Gbps per wavelength (hereinafter referred to as 10 G in some cases). However, the ever increasing communication traffic drives research and development on high-speed communication systems having a transmission rate of 40 Gbps (hereinafter referred to as 40 G in some cases).

In such WDM communication systems, it is necessary to measure the power of optical signals to control, for example, the output power of optical amplifier in a optical repeater node. A typical method for measuring the power of optical signals is to use an optical spectrum analyzer to measure the power in the frequency domain.

Since a modulated optical signal has a broader optical spectrum, it is necessary to measure at a wavelength resolution appropriate for the optical spectral width of the optical signal to measure the power accurately. Furthermore, since the optical spectral width of an optical signal propagating at a higher speed is typically broader, it is necessary to measure a high-speed optical signal at a broader wavelength resolution.

SUMMARY OF THE INVENTION

Various embodiments of the present invention provide an apparatus that includes an information acquisition section that acquires information on an optical signal transmitted in a wavelength multiplexing scheme; a spectrum data acquisition section that acquires optical spectrum of the optical signal; and a measurement section that measures power of the optical signal based on the optical spectrum and the information on the optical signal acquired by the information acquisition section.

Various embodiments of the present invention provide an apparatus that includes an information acquisition section that acquires information on an optical signal transmitted in a wavelength multiplexing scheme; a storage section that stores correction values for the power of the optical signal corresponding to the information on the optical signal; a selection section that selects from the storage section a correction value corresponding to the information on the optical signal acquired by the information acquisition section; a spectrum data acquisition section that acquires an optical spectrum of the optical signal; and a measurement section that measures the power of the optical signal by calculating the power of the optical signal based on the optical spectrum and the correction value selected by the selection section.

Various embodiments of the present invention provide a method that includes acquiring information on an optical signal transmitted in a wavelength multiplexing scheme; selecting, from a storage section containing correction values for the power of the optical signal corresponding to the information on the optical signal, a correction value corresponding to the information on the optical signal acquired in the signal information acquisition step; acquiring an optical spectrum of the optical signal; and measuring the power of the optical signal by calculating the power of the optical signal based on the optical spectrum and the correction value selected in the selecting.

The above examples are only examples of various embodiments of the present invention. All embodiments are not limited to including the features of these examples.

BRIEF DESCRIPTION OF THE DRAWINGS

FIG. 14 shows an example of a table stored in a storage section in the optical power measurement apparatus according to the first embodiment;

DETAILED DESCRIPTION OF THE EMBODIMENTS

Preferred embodiments of the optical power measurement apparatus and the optical power measurement method according to the invention will be described below in detail with reference to the accompanying drawings.

Figure 1:
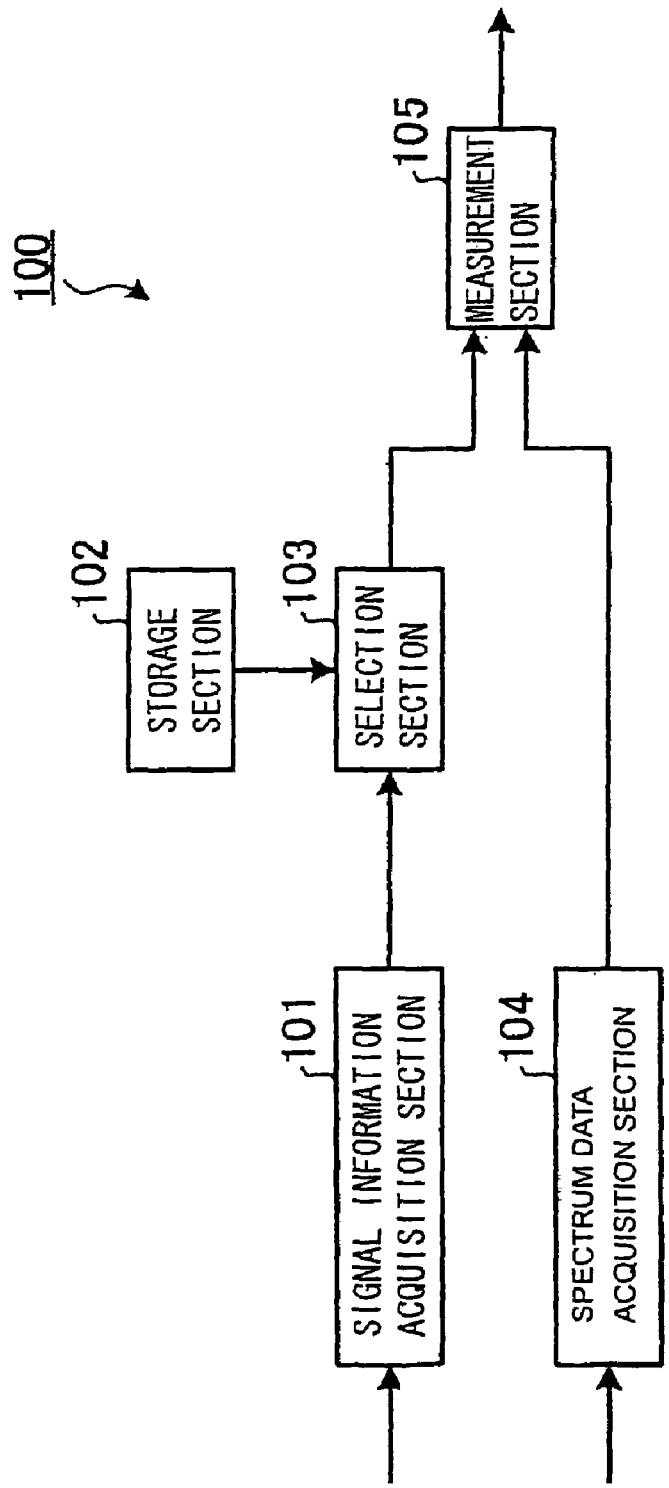
FIG. 1 is a block diagram showing an example of the configuration of the optical power measurement apparatus according to a first embodiment.

FIG. 1 is a block diagram showing an example of the configuration of the optical power measurement apparatus according to an embodiment. As shown in FIG. 1, the optical power measurement apparatus 100 according to an embodiment includes a signal information acquisition section 101, a storage section 102, a selection section 103, a spectrum data acquisition section 104, and a measurement section 105. The optical power measurement apparatus 100 is an optical power measurement apparatus that measures the power of an optical signal in a WDM communication system.

The signal information acquisition section 101 acquires information on an optical signal including the channel to be measured. The information on an optical signal includes information on optical signals in the adjacent channels to which wavelengths adjacent to that assigned to the channel to be measured are assigned in WDM transmission, such as ON/OFF (presence/absence), modulation formats, bit rates and wavelengths. The information on an optical signal may include information on the optical signal in the channel to be measured itself, that is, the modulation format, the bit rate and the wavelength.

The signal information acquisition section 101 acquires information on the optical signal in the channel to be measured, for example, from a network management system (NMS). The signal information acquisition section 101 outputs the acquired information on the optical signal to the selection section 103.

The storage section 102 stores a table containing correction values corresponding to the information on the optical signal. For example, the storage section 102 stores a table containing correction values for the following conditions: ON/OFF, modulation formats, bit rates, wavelengths and the like of the optical signals in the channels adjacent to the channel to be measured. The storage section 102 may store a table containing correction values for the following conditions including the modulation format, the bit rate and the wavelength of the optical signal in the channel to be measured itself. The storage section 102 outputs the stored table to the selection section 103.

From the table outputted from the storage section 102, the selection section 103 selects the correction value corresponding to the information on the optical signal outputted from the signal information acquisition section 101. The selection section 103 outputs the selected correction value to the measurement section 105.

The spectrum data acquisition section 104 acquires the optical spectrum of the optical signal in the channel to be measured. In the first embodiment, the spectrum data acquisition section 104 acquires the optical spectrum at a wavelength resolution broader than the optical spectral width of the optical signal (1.0 nm in this embodiment). The spectrum data acquisition section 104 is, for example, formed of an optical spectrum analyzer. The spectrum data acquisition section 104 outputs the acquired optical spectrum to the measurement section 105.

The measurement section 105 measures the power of the optical signal by calculating the power of the optical signal based on the optical spectrum outputted from the spectrum data acquisition section 104 and the correction value outputted from the selection section 103. Specifically, the measurement section 105 uses the correction value outputted from the selection section 103 to correct the power of the optical signal obtained from the optical spectrum outputted from the spectrum data acquisition section 104. In this way, the measurement section 105 can measure the power of the actual optical signal more accurately than the power of the optical signal obtained from the optical spectrum.

Figure 2:
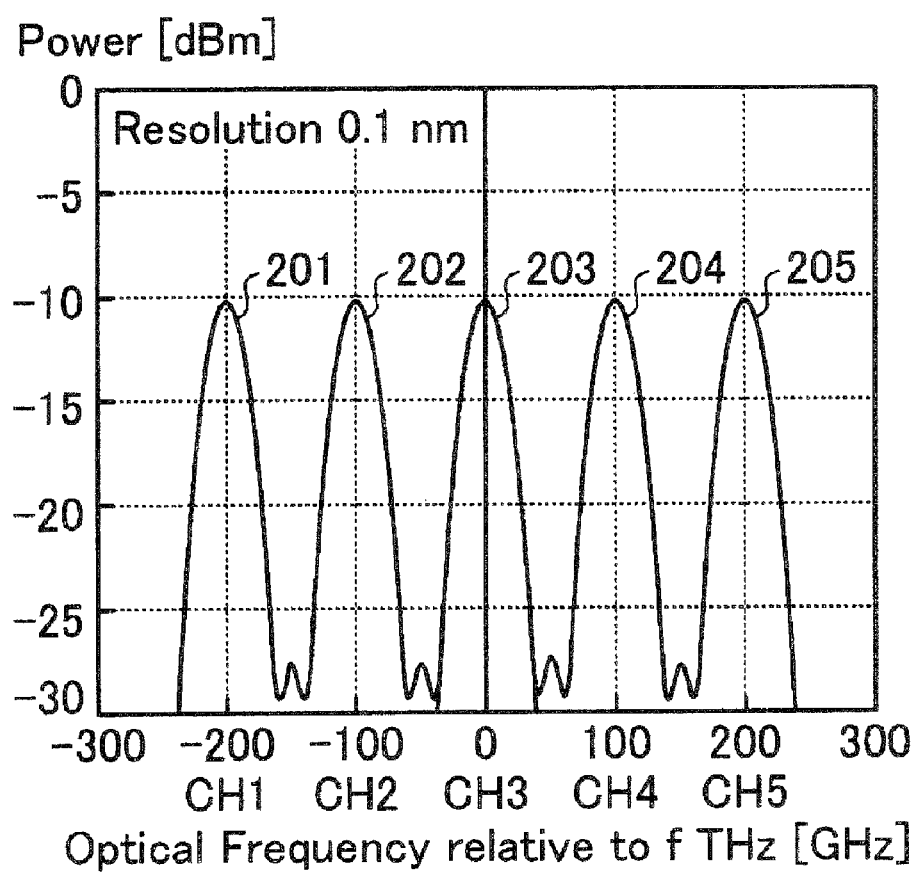
FIG. 2 shows an example of optical spectra when optical signals in the channel to be measured and the adjacent channels are 40 G (wavelength resolution: 0.1 nm)
Figure 3:
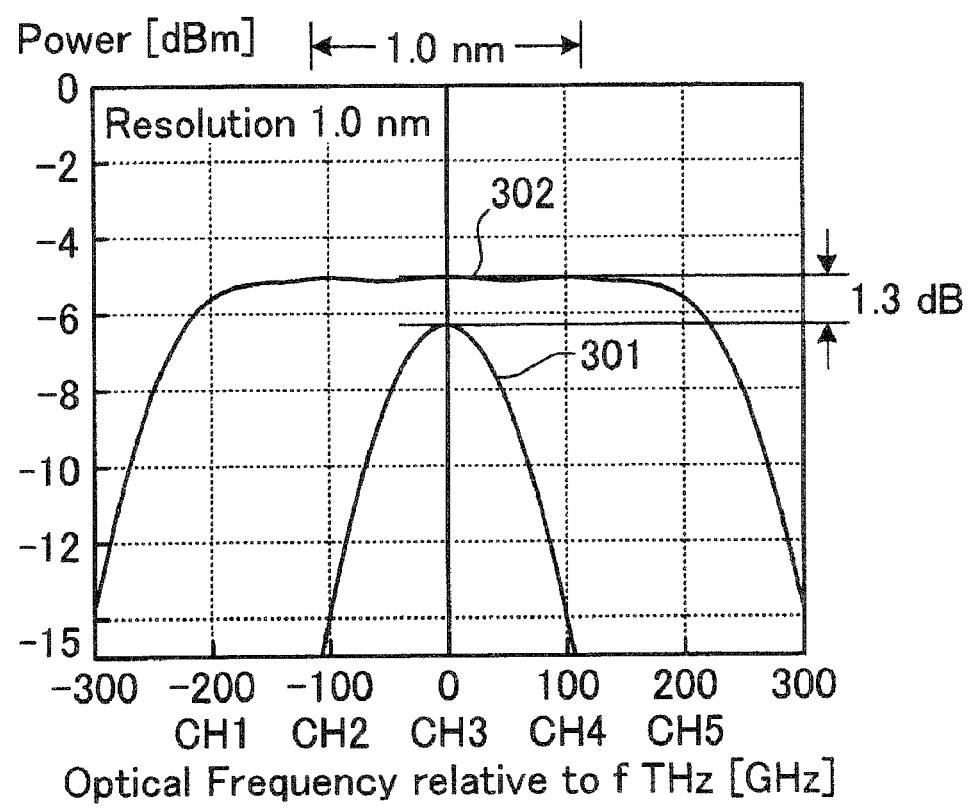
FIG. 3 shows an example of optical spectra when optical signals in the channel to be measured and the adjacent channels are 40 G (wavelength resolution: 1.0 nm)

FIG. 2 shows an example of optical spectra when the optical signals in the channel to be measured and the adjacent channels are 40 G (wavelength resolution: 0.1 nm). FIG. 3 shows an example of optical spectra when the optical signals in the channel to be measured and the adjacent channels are 40 G (wavelength resolution: 1.0 nm). In FIG. 2, the horizontal axis represents the relative frequency of the optical signal (Optical Frequency relative to f THz [GHz]), and the vertical axis represents the power of the component of the optical signal (Power [dBm]) (the same for FIGS. 3 to 13 and FIGS. 15 to 20).

In the figures, the optical signals in the channels 1 to 5 have wavelengths different from each other, the wavelengths assigned in 100 GHz spacing. The optical spectra 201 to 205 are those of the optical signals in the channels 1 to 5. The optical signal in the channel 3 is the optical signal in the channel to be measured, and the optical signals in the channels 2 and 4 are the optical signals in the channels adjacent to the channel to be measured. The 40 G optical signal is the optical signal modulated by using an RZ-DQPSK modulation format.

As shown in FIG. 2, when the optical signals in the channel to be measured and the adjacent channels are 40 G, the wavelength resolution of 0.1 nm, which is narrower than the optical spectral width of the optical signal, prevents the components of the optical spectra 202 and 204 of the optical signals in the adjacent channels from being mixed with the optical spectrum 203 of the optical signal in the channel to be measured. On the other hand, since the wavelength resolution of 0.1 nm does not contain the entire optical signal in the channel 3, the measured power of the optical signal is lower than the actual power.

In FIG. 3, the optical spectrum 301 is the optical spectrum obtained by measuring the optical signal in the channel 3 when no adjacent channel is present. The optical spectrum 302 is the optical spectrum obtained by measuring the optical signal in the channel 3 when the adjacent channels are present. The optical spectrum 301 is an ideal optical spectrum measurement result because the wavelength resolution is broad enough (1.0 nm) with respect to the optical signal in the channel 3 and there is no component of the optical signal in the adjacent channels.

In contrast, in the optical spectrum 302, the wavelength resolution is broad enough with respect to the optical signal in the channel 3, so that the wavelength resolution contains the entire optical signal in the channel 3. On the other hand, the components of the optical signals in the channels 2 and 4 will be mixed with the optical spectrum 302. The measured power of the optical spectrum 302 is therefore higher than that of the ideal optical spectrum 301 by approximately 1.3 dB.

Figure 4:
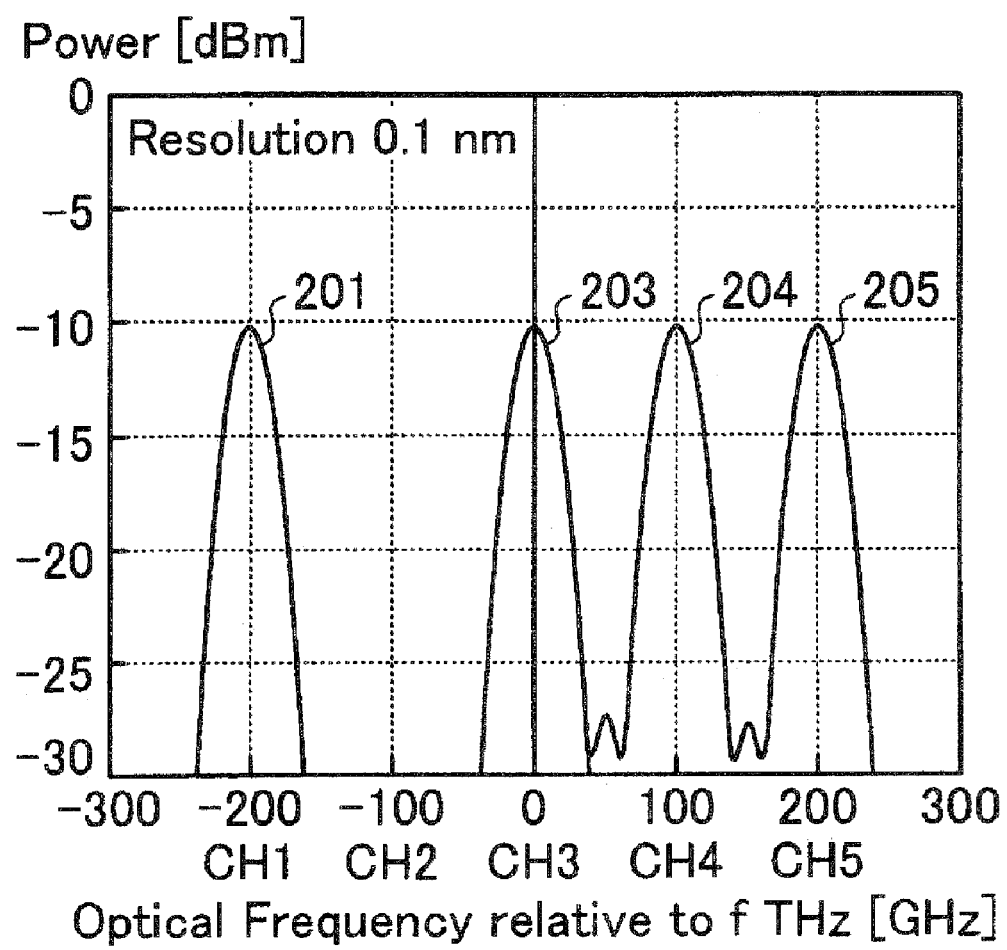
FIG. 4 shows an example of optical spectra when the optical signal in the channel to be measured and the optical signal in one of the adjacent channels are 40 G while the optical signal in the other adjacent channel is OFF (wavelength resolution: 0.1 nm)
Figure 5:
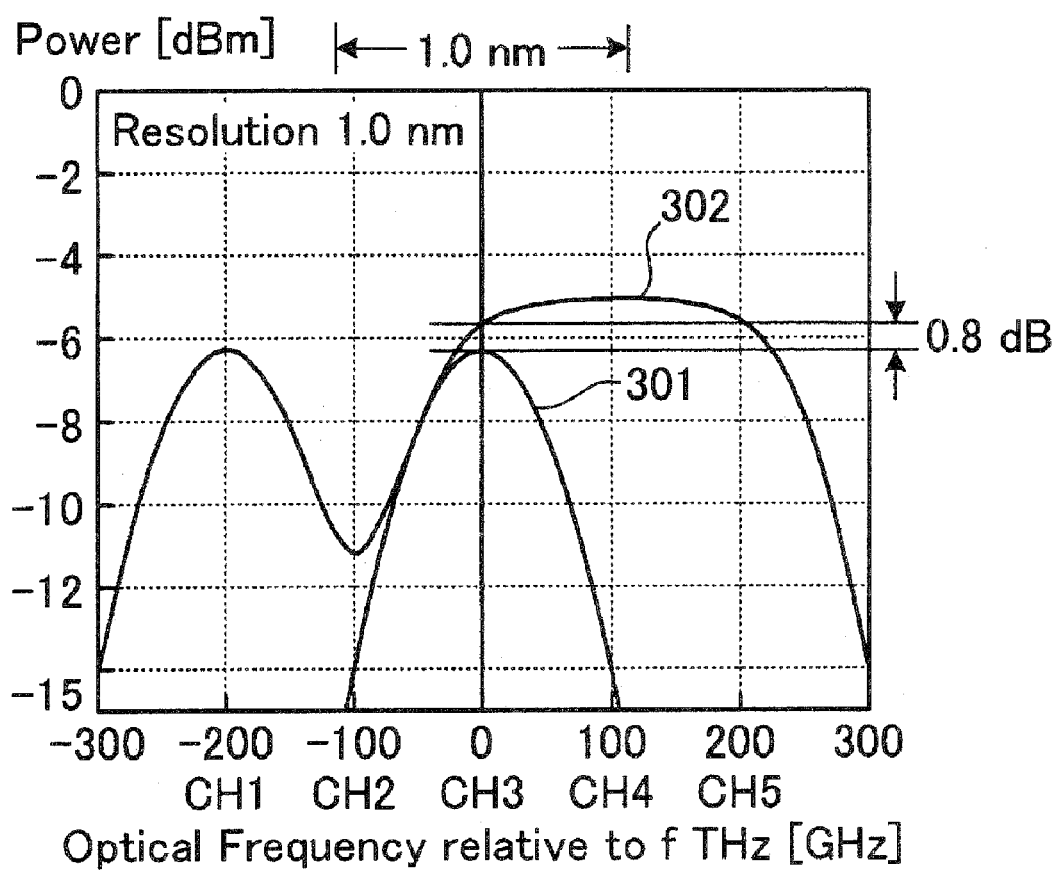
FIG. 5 shows an example of optical spectra when the optical signal in the channel to be measured and the optical signal in one of the adjacent channels are 40 G while the optical signal in the other adjacent channel is OFF (wavelength resolution: 1.0 nm)

FIG. 4 shows an example of optical spectra when the optical signal in the channel to be measured and the optical signal in one of the adjacent channels are 40 G while the optical signal in the other adjacent channel is OFF (wavelength resolution: 0.1 nm). FIG. 5 shows an example of optical spectra when the optical signal in the channel to be measured and the optical signal in one of the adjacent channels are 40 G while the optical signal in the other adjacent channel is OFF (wavelength resolution: 1.0 nm).

In FIGS. 4 and 5, the portions similar to those in FIGS. 2 and 3 have the same reference numerals and the description thereof will be omitted. When the optical signal in the channel 2 is OFF as shown in FIG. 4, the components of the optical signal in the channel 2 are not mixed with the optical spectrum 302, for example as shown in FIG. 5. On the other hand, the components of the optical signal in the channel 4 are mixed with the optical spectrum 302. The measured power of the optical spectrum 302 is therefore higher than that of the ideal optical spectrum 301 by approximately 0.8 dB.

Figure 6:
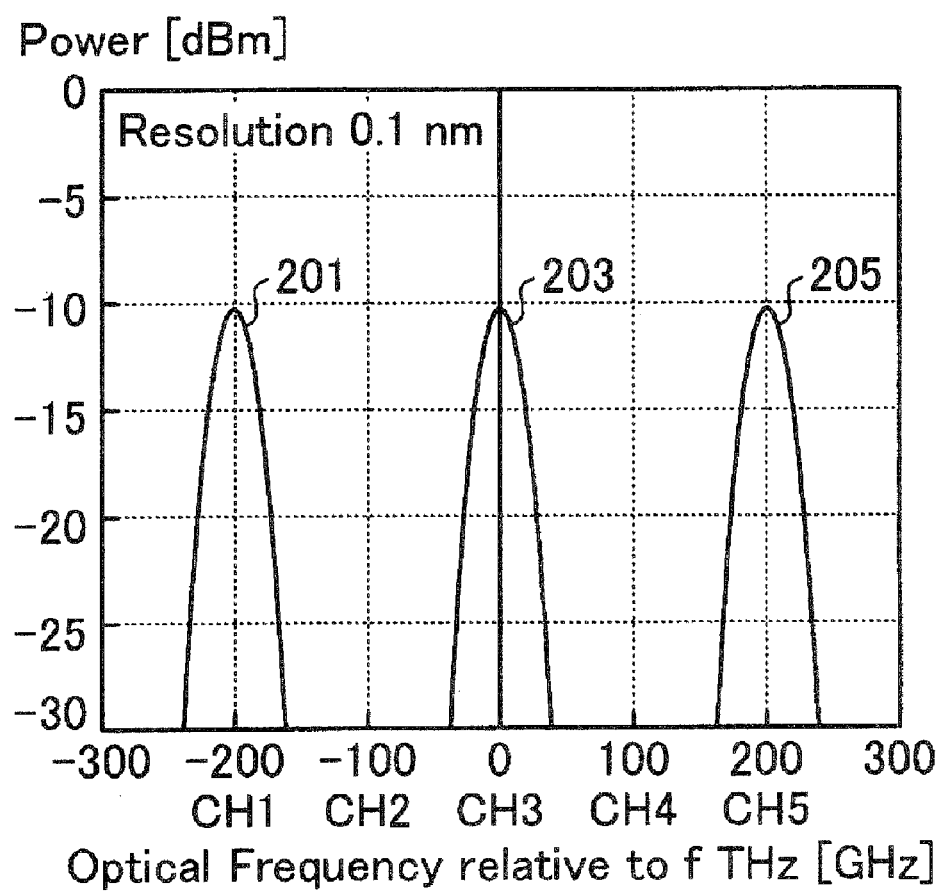
FIG. 6 shows an example of optical spectra when the optical signal in the channel to be measured is 40 G while the optical signals in the adjacent channels are OFF (wavelength resolution: 0.1 nm)
Figure 7:
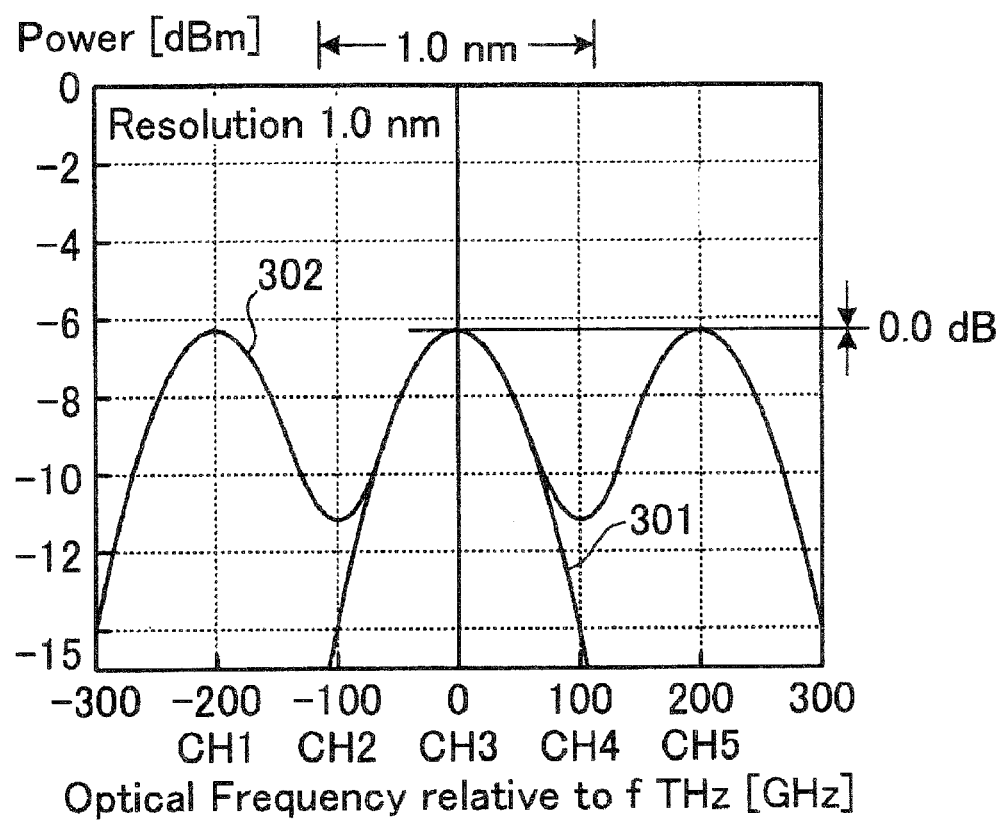
FIG. 7 shows an example of optical spectra when the optical signal in the channel to be measured is 40 G while the optical signals in the adjacent channels are OFF (wavelength resolution: 1.0 nm)

FIG. 6 shows an example of optical spectra when the optical signal in the channel to be measured is 40 G while the optical signals in the adjacent channels are OFF (wavelength resolution: 0.1 nm). FIG. 7 shows an example of optical spectra when the optical signal in the channel to be measured is 40 G while the optical signals in the adjacent channels are OFF (wavelength resolution: 1.0 nm).

In FIGS. 6 and 7, the portions similar to those in FIGS. 2 and 3 have the same reference numerals and the description thereof will be omitted. When the optical signals in the channels 2 and 4 are OFF as shown in FIG. 6, the components of the optical signals in the channels 2 and 4 are not mixed with the optical spectrum 302, for example as shown in FIG. 7. The measured power of the optical spectrum 302 is therefore the same as that of the ideal optical spectrum 301.

Figure 8:
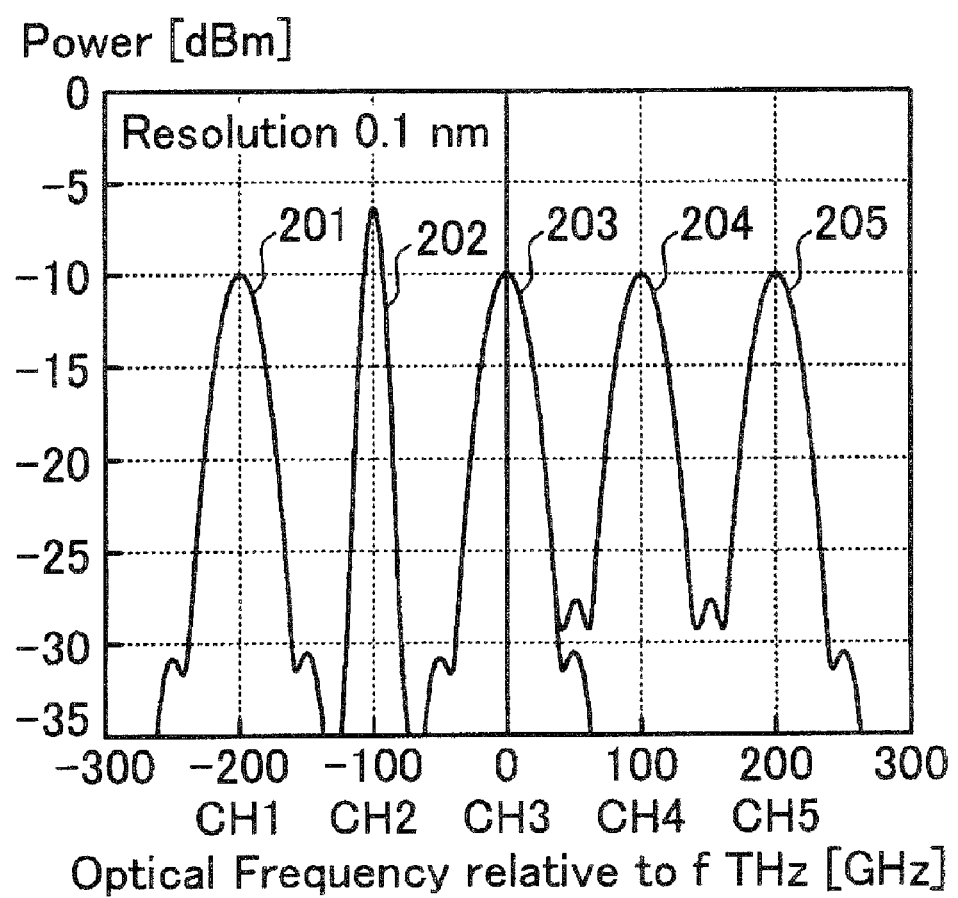
FIG. 8 shows an example of optical spectra when the optical signal in the channel to be measured and the optical signal in one of the adjacent channels are 40 G while the optical signal in the other adjacent channel is 10 G (wavelength resolution: 0.1 nm)
Figure 9:
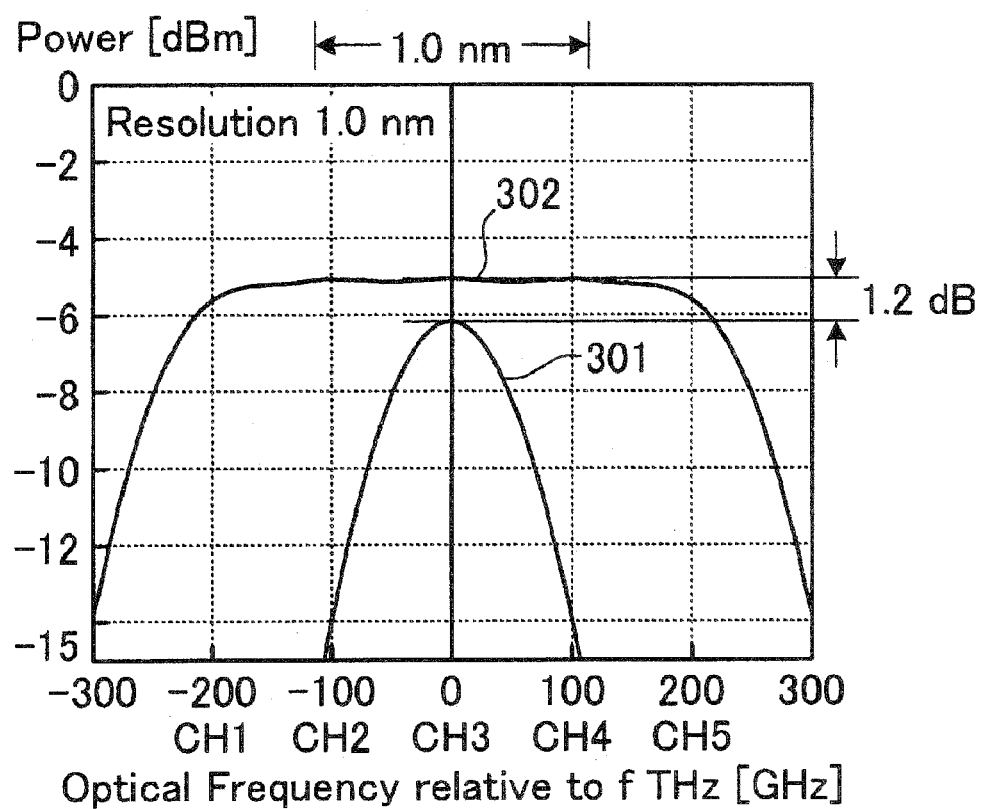
FIG. 9 shows an example of optical spectra when the optical signal in the channel to be measured is 40 G while the optical signals in the adjacent channels are OFF (wavelength resolution: 1.0 nm)

FIG. 8 shows an example of optical spectra when the optical signal in the channel to be measured and the optical signal in one of the adjacent channels are 40 G while the optical signal in the other adjacent channel is 10 G (wavelength resolution: 0.1 nm). FIG. 9 shows an example of optical spectra when the optical signal in the channel to be measured is 40 G while the optical signals in the adjacent channels are OFF (wavelength resolution: 1.0 nm).

In FIGS. 8 and 9, the portions similar to those in FIGS. 2 and 3 have the same reference numerals and the description thereof will be omitted. In these examples, the 10 G optical signal is the optical signal modulated by using an NRZ modulation format (the same for the following examples). When the optical signal in the channel 2 is 10 G as shown in FIG. 8, the components of the optical signals in the channels 2 and 4 are mixed with the optical spectrum 302, for example as shown in FIG. 9. The measured power of the optical spectrum 302 is therefore higher than that of the ideal optical spectrum 301 by approximately 1.2 dB.

Figure 10:
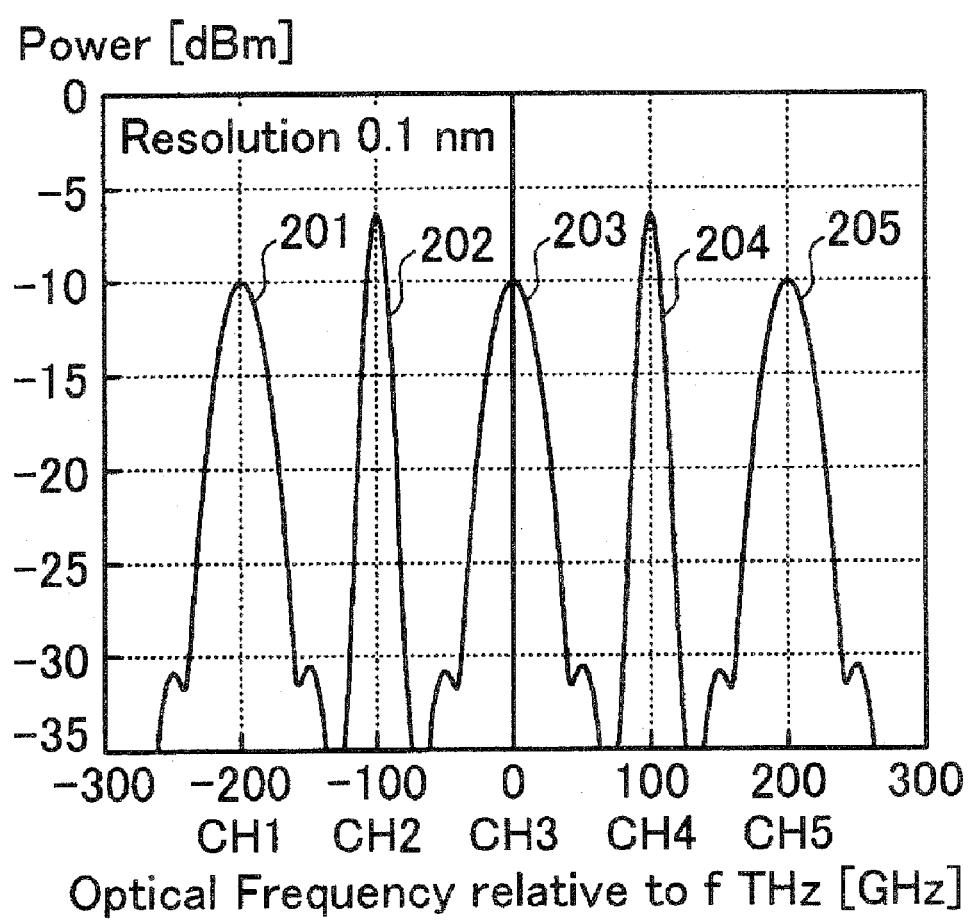
FIG. 10 shows an example of optical spectra when the optical signal in the channel to be measured is 40 G while the optical signals in the adjacent channels are 10 G (wavelength resolution: 0.1 nm)
Figure 11:
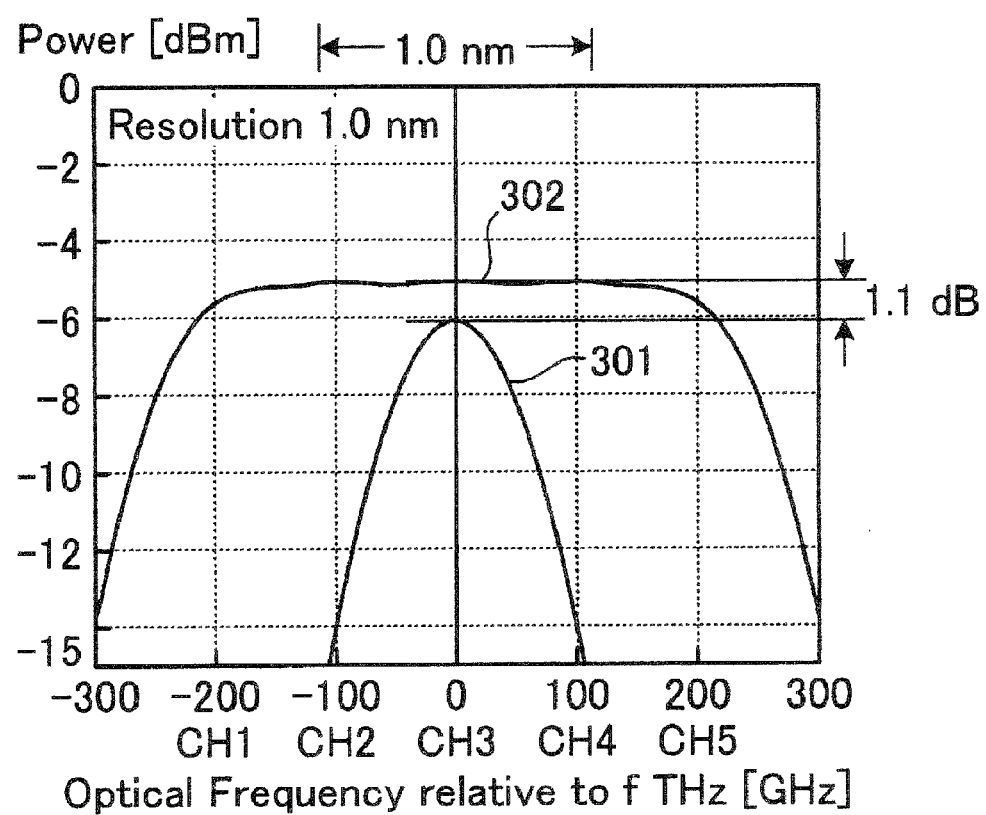
FIG. 11 shows an example of optical spectra when the optical signal in the channel to be measured is 40 G while the optical signals in the adjacent channels are 10 G (wavelength resolution: 1.0 nm)

FIG. 10 shows an example of optical spectra when the optical signal in the channel to be measured is 40 G while the optical signals in the adjacent channels are 10 G (wavelength resolution: 0.1 nm). FIG. 11 shows an example of optical spectra when the optical signal in the channel to be measured is 40 G while the optical signals in the adjacent channels are 10 G (wavelength resolution: 1.0 nm).

In FIGS. 10 and 11, the portions similar to those in FIGS. 2 and 3 have the same reference numerals and the description thereof will be omitted. When the optical signals in the channels 2 and 4 are 10 G as shown in FIG. 10, the components of the optical signals in the channels 2 and 4 are mixed with the optical spectrum 302, for example as shown in FIG. 11. The measured power of the optical spectrum 302 is therefore higher than that of the ideal optical spectrum 301 by approximately 1.1 dB.

Figure 12:
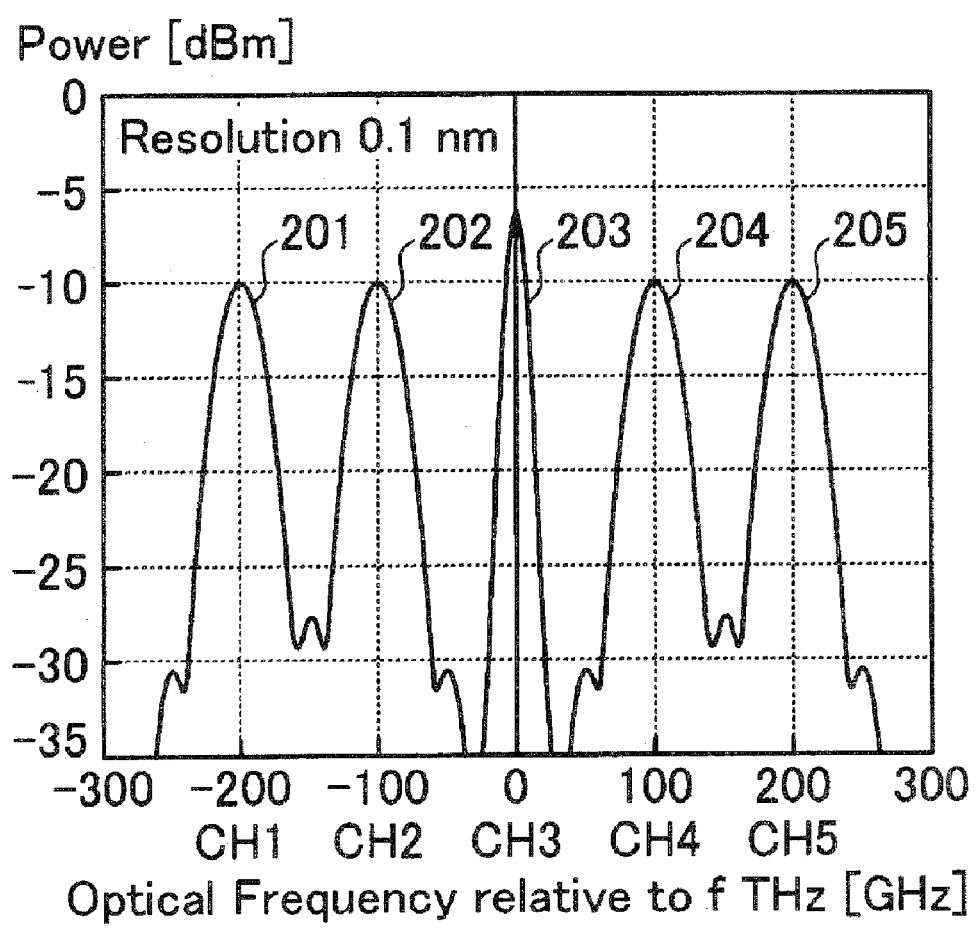
FIG. 12 shows an example of optical spectra when the optical signal in the channel to be measured is 10 G while the optical signals in the adjacent channels are 40 G (wavelength resolution: 0.1 nm)
Figure 13:
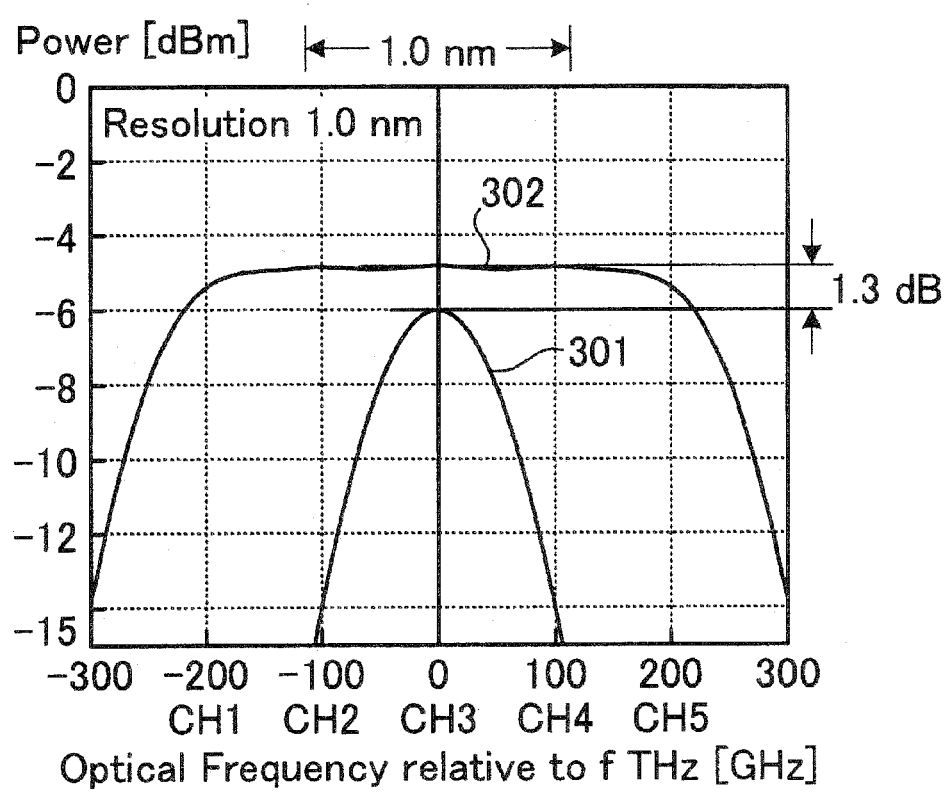
FIG. 13 shows an example of optical spectra when the optical signal in the channel to be measured is 10 G while the optical signals in the adjacent channels are 40 G (wavelength resolution: 1.0 nm)

FIG. 12 shows an example of optical spectra when the optical signal in the channel to be measured is 10 G while the optical signals in the adjacent channels are 40 G (wavelength resolution: 0.1 nm). FIG. 13 shows an example of optical spectra when the optical signal in the channel to be measured is 10 G while the optical signals in the adjacent channels are 40 G (wavelength resolution: 1.0 nm).

In FIGS. 12 and 13, the portions similar to those in FIGS. 2 and 3 have the same reference numerals and the description thereof will be omitted. When the optical signal in the channel 3 is 10 G as shown in FIG. 12, the components of the optical signals in the channels 2 and 4 are mixed with the optical spectrum 302, for example as shown in FIG. 13. The measured power of the optical spectrum 302 is therefore higher than that of the ideal optical spectrum 301 by approximately 1.3 dB.

FIG. 14 shows an example of the table stored in the storage section in the optical power measurement apparatus according to an embodiment. The table shown in FIG. 14 can be created from the results shown in FIGS. 2 to 13. When the optical signals in the channels 2 and 4 are 40 G, the correction value is −1.3 (see FIGS. 2 and 3). When one of the optical signals in the channels 2 and 4 is 40 G while the other optical signal is OFF, the correction value is −0.8 (see FIGS. 4 and 5). When the optical signals in the channels 2 and 4 are OFF, the correction value is 0 (see FIGS. 6 and 7).

When one of the optical signals in the channels 2 and 4 is 40 G while the other optical signal is 10 G, the correction value is −1.2 (see FIGS. 8 and 9). When the optical signals in the channels 2 and 4 are 10 G, the correction value is −1.1 (see FIGS. 10 and 11). Although not illustrated, the table stored in the storage section 102 in the optical power measurement apparatus 100 may include correction values determined by the condition of the channel 3, which is the channel to be measured (see FIGS. 12 and 13).

As described above, in the optical power measurement apparatus 100 according to an embodiment, the spectrum data acquisition section 104 acquires the optical spectrum 203 at a wavelength resolution broader than the optical spectral width of the optical spectrum 203, and the selection section 103 can perform correction based on a negative correction value in the table stored in the storage section 102. It is therefore possible to accurately measure the power of an optical signal in a WDM communication system.

Figure 15:
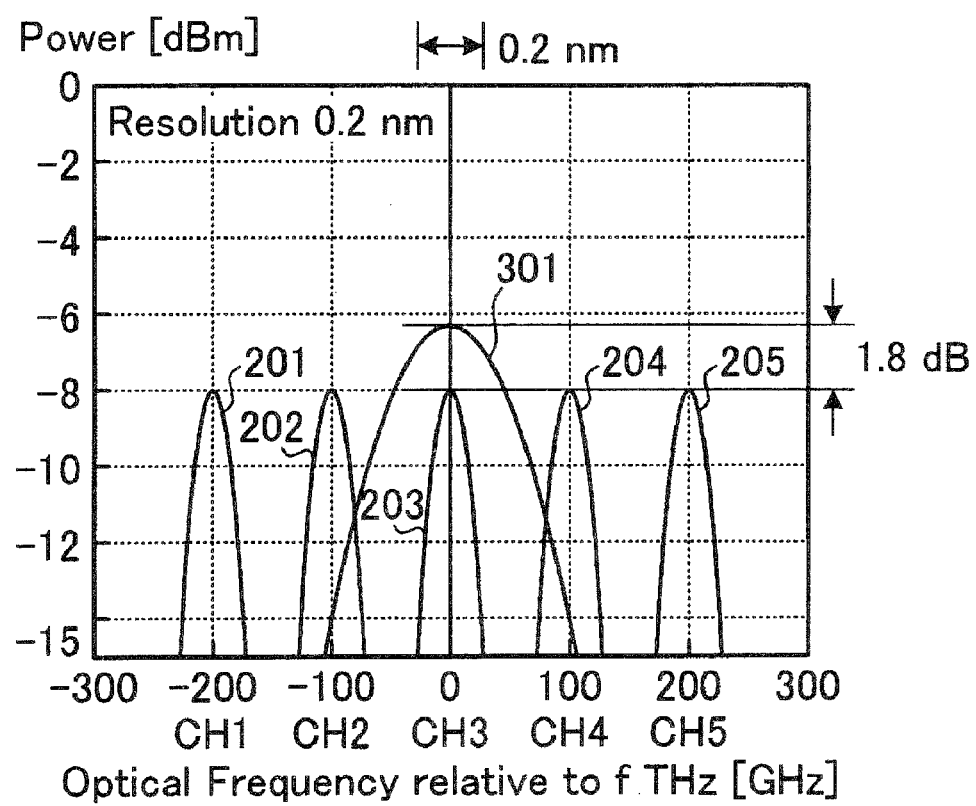
FIG. 15 shows an example of optical spectra when the optical signals in the channel to be measured and the adjacent channels are 40 G (wavelength resolution: 0.2 nm)

FIG. 15 shows an example of optical spectra when the optical signals in the channel to be measured and the adjacent channels are 40 G (wavelength resolution: 0.2 nm). In FIG. 15, the portions similar to those in FIGS. 2 and 3 have the same reference numerals and the description thereof will be omitted (the same for FIGS. 16 to 20). In an embodiment, the spectrum data acquisition section 104 acquires optical spectra at a wavelength resolution narrower than the optical spectral width of the optical signal (0.2 nm in this embodiment).

When the optical signals in the channels 2 and 4 are 40 G as shown in FIG. 2, the components of the optical signals in the channels 2 and 4 are not mixed with the optical spectrum 203 of the optical signal in the channel 3, which is the channel to be measured, as shown in FIG. 15. On the other hand, the wavelength resolution of 0.2 nm does not contain the entire optical signal in the channel 3, so that the measured power of the optical spectrum 203 is lower than that of the ideal optical spectrum 301 by approximately 1.8 dB.

Figure 16:
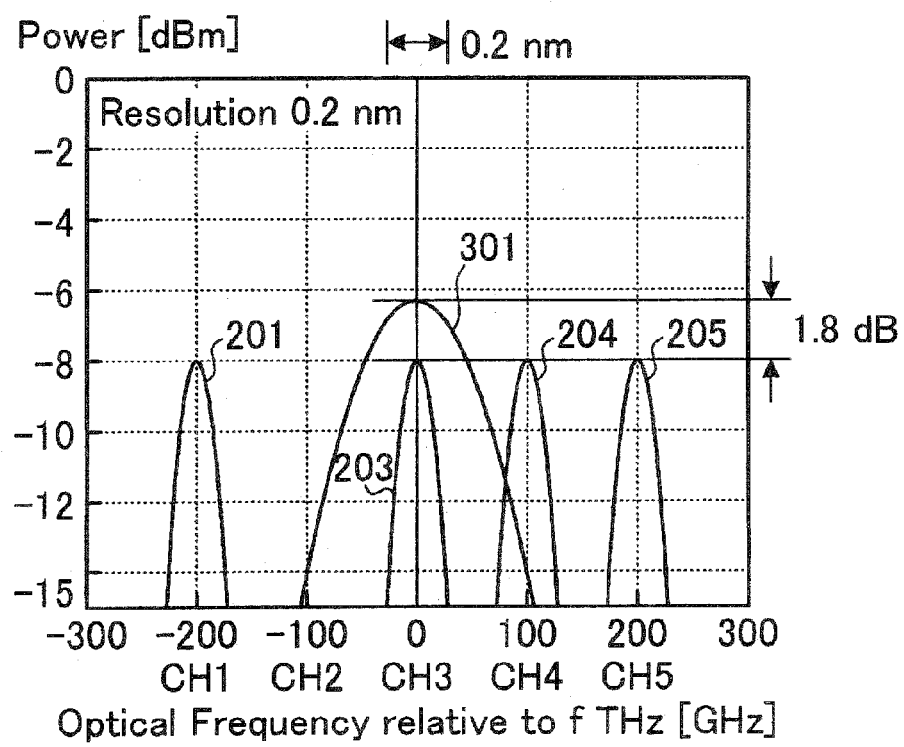
FIG. 16 shows an example of optical spectra when the optical signal in the channel to be measured and the optical signal in one of the adjacent channels are 40 G while the optical signal in the other adjacent channel is OFF (wavelength resolution: 0.2 nm)

FIG. 16 shows an example of optical spectra when the optical signal in the channel to be measured and the optical signal in one of the adjacent channels are 40 G while the optical signal in the other adjacent channel is OFF (wavelength resolution: 0.2 nm). When the optical signal in the channel 2 is OFF as shown in FIG. 4, the components of the optical signals in the channels 2 and 4 are not mixed with the optical spectrum 203 of the optical signal in the channel 3, which is the channel to be measured, for example as shown in FIG. 16. On the other hand, the wavelength resolution of 0.2 nm does not contain the entire optical signal in the channel 3, so that the measured power of the optical spectrum 203 is lower than that of the ideal optical spectrum 301 by approximately 1.8 dB.

Figure 17:
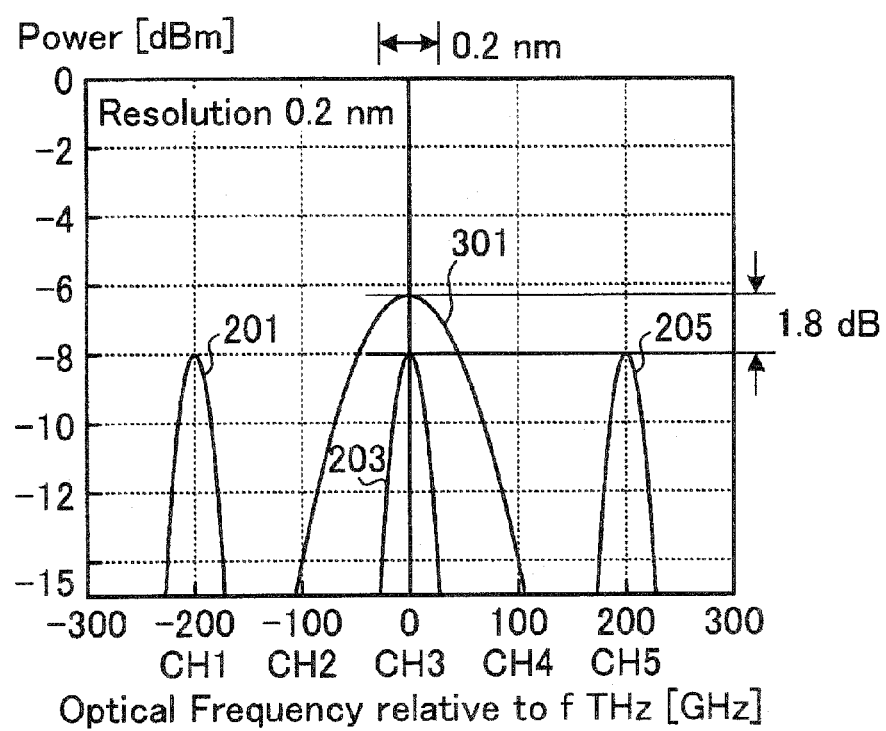
FIG. 17 shows an example of optical spectra when the optical signal in the channel to be measured is 40 G while the optical signals in the adjacent channels are OFF (wavelength resolution: 0.2 nm)

FIG. 17 shows an example of optical spectra when the optical signal in the channel to be measured is 40 G while the optical signals in the adjacent channels are OFF (wavelength resolution: 0.2 nm). When the optical signals in the channels 2 and 4 are OFF as shown in FIG. 6, the components of the optical signals in the channels 2 and 4 are not mixed with the optical spectrum 203 of the optical signal in the channel 3, which is the channel to be measured, for example as shown in FIG. 17. On the other hand, the wavelength resolution of 0.2 nm does not contain the entire optical signal in the channel 3, so that the measured power of the optical spectrum 203 is lower than that of the ideal optical spectrum 301 by approximately 1.8 dB.

Figure 18:
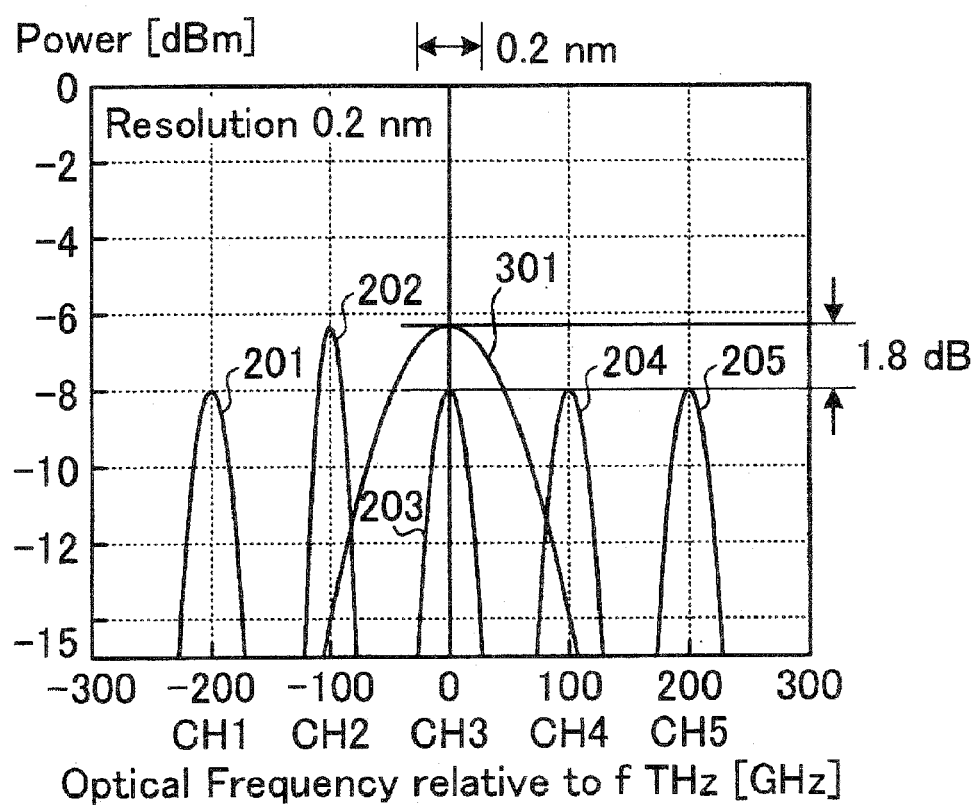
FIG. 18 shows an example of optical spectra when the optical signal in the channel to be measured and the optical signal in one of the adjacent channels are 40 G while the optical signal in the other adjacent channel is 10 G (wavelength resolution: 0.2 nm)

FIG. 18 shows an example of optical spectra when the optical signal in the channel to be measured and the optical signal in one of the adjacent channels are 40 G while the optical signal in the other adjacent channel is 10 G (wavelength resolution: 0.2 nm). When the optical signal in the channel 2 is 10 G as shown in FIG. 8, the components of the optical signals in the channels 2 and 4 are not mixed with the optical spectrum 203 of the optical signal in the channel 3, which is the channel to be measured, for example as shown in FIG. 18. On the other hand, the wavelength resolution of 0.2 nm does not contain the entire optical signal in the channel 3, so that the measured power of the optical spectrum 203 is lower than that of the ideal optical spectrum 301 by approximately 1.8 dB.

Figure 19:
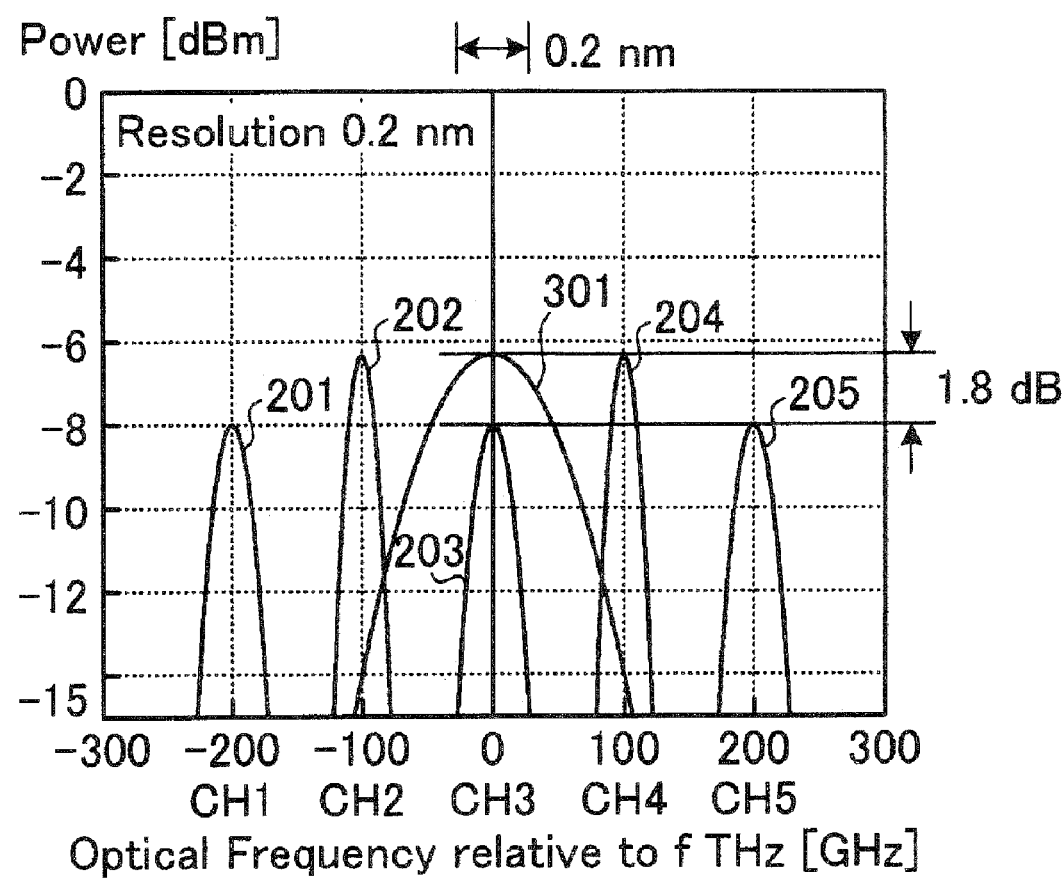
FIG. 19 shows an example of optical spectra when the optical signal in the channel to be measured is 40 G while the optical signals in the adjacent channels are 10 G (wavelength resolution: 0.2 nm)

FIG. 19 shows an example of optical spectra when the optical signal in the channel to be measured is 40 G while the optical signals in the adjacent channels are 10 G (wavelength resolution: 0.2 nm). When the optical signals in the channels 2 and 4 are 10 G as shown in FIG. 10, the components of the optical signals in the channels 2 and 4 are not mixed with the optical spectrum 203 of the optical signal in the channel 3, which is the channel to be measured, as shown in FIG. 19. On the other hand, the wavelength resolution of 0.2 nm does not contain the entire optical signal in the channel 3, so that the measured power of the optical spectrum 203 is lower than that of the ideal optical spectrum 301 by approximately 1.8 dB.

Figure 20:
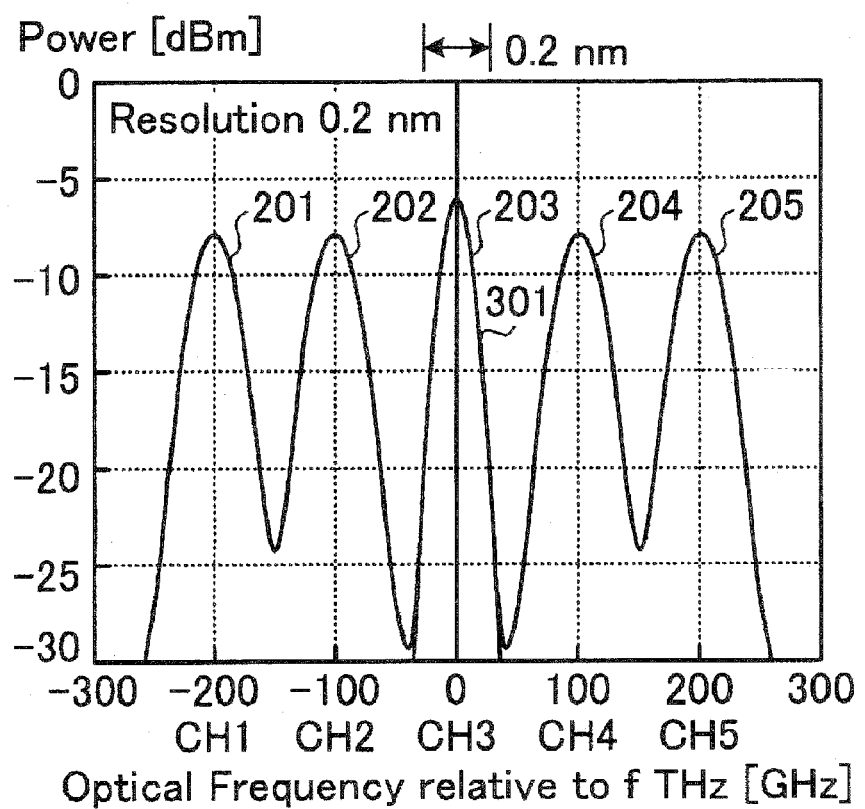
FIG. 20 shows an example of optical spectra when the optical signal in the channel to be measured is 10 G while the optical signals in the adjacent channels are 40 G (wavelength resolution: 0.2 nm)

FIG. 20 shows an example of optical spectra when the optical signal in the channel to be measured is 10 G while the optical signals in the adjacent channels are 40 G (wavelength resolution: 0.2 nm). When the optical signal in the channel 3 is 10 G as shown in FIG. 12, the components of the optical signals in the channels 2 and 4 are not mixed with the optical spectrum 203, as shown in FIG. 20. On the other hand, the wavelength resolution of 0.2 nm contains the entire optical signal in the channel 3, so that the measured power of the optical spectrum 203 is the same as that of the ideal optical spectrum 301.

As described above, when the spectrum data acquisition section 104 acquires optical spectra at a wavelength resolution of 0.2 nm and the channel 3, which is the channel to be measured, is 40 G, the measured power of the optical spectrum 203 is always lower than that of the ideal optical spectrum 301 by 1.8 dB, so that the correction value is always +1.8 dB. On the other hand, when the channel 3 is 10 G, the measured power of the optical spectrum 203 is always the same as that of the ideal optical spectrum 301, so that the correction value is 0 dB.

As described above, in the optical power measurement apparatus 100 according to an embodiment, the spectrum data acquisition section 104 acquires the optical spectrum 203 at the wavelength resolution narrower than the optical spectral width of the optical spectrum 203, and the selection section 103 can perform correction based on positive correction values in the table stored in the storage section 102. It is therefore possible to accurately measure the power of an optical signal in a WDM communication system.

The spectrum data acquisition section 104 in the optical power measurement apparatus 100 according to the embodiments may acquire optical spectra of an optical signal at a wavelength resolution according to the information on the optical signal. For example, the spectrum data acquisition section 104 acquires the information on the optical signal from the signal information acquisition section 101 and sets the resolution to 1.0 nm when the bit rate in the channel to be measured is 40 Gbps (see FIG. 3). On the other hand, the spectrum data acquisition section 104 sets the resolution to 0.2 nm when the bit rate in the channel to be measured is 10 Gbps (see FIG. 20).

Although the embodiments have been described with reference to the 40 G optical signals modulated by using an RZ-DQPSK modulation format and the 10 G optical signals modulated by using an NRZ modulation format by way of example of the bit rate and the modulation format of the optical signal, the bit rate and the modulation format of the optical signal are not limited thereto.

Figure 21:
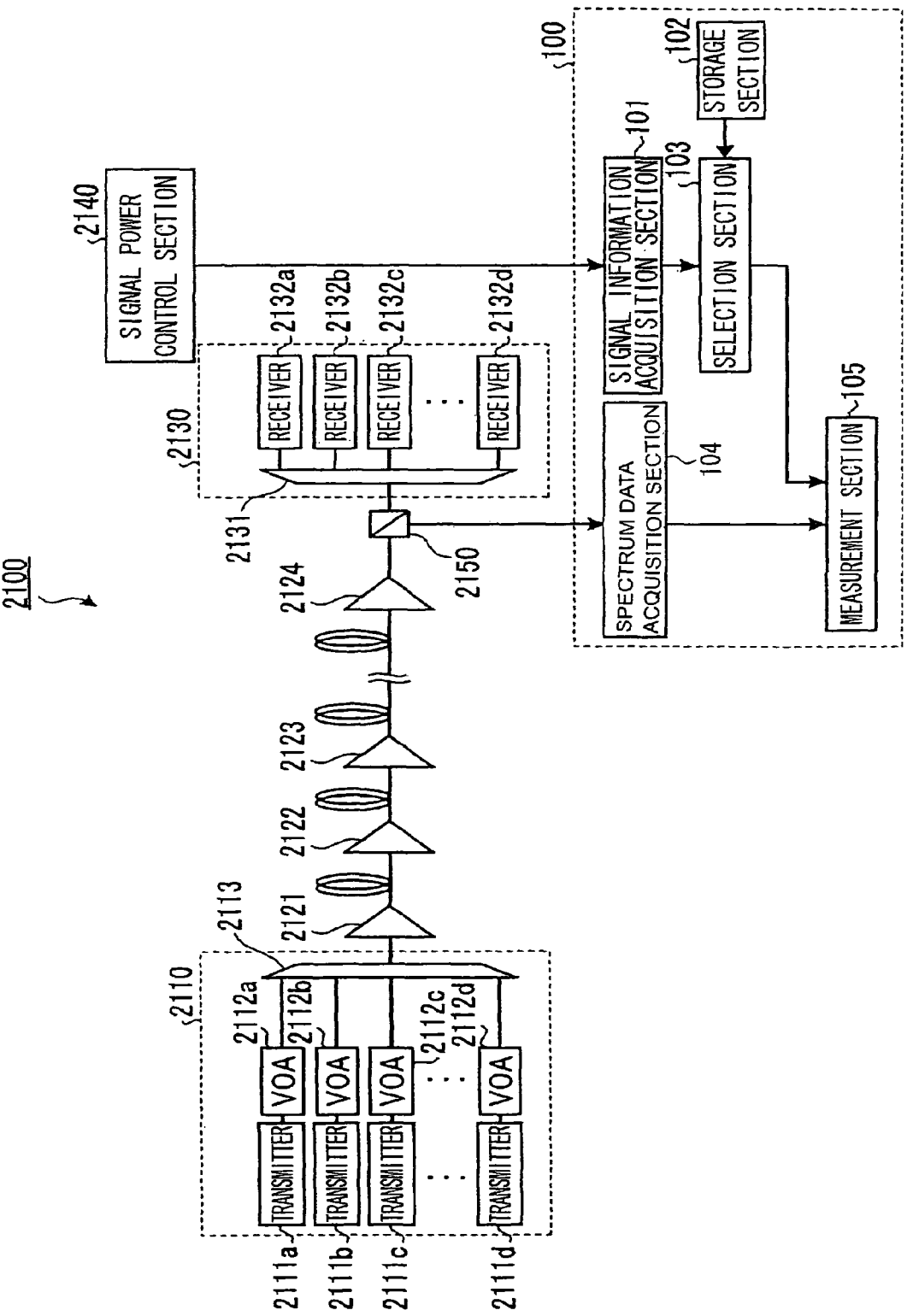
FIG. 21 is a block diagram showing an example of the configuration of a communication system to which the optical power measurement apparatus according to a third embodiment is applied.

FIG. 21 is a block diagram showing an example of the configuration of a communication system to which the optical power measurement apparatus according to an embodiment is applied. As shown in FIG. 21, the communication system 2100 according to an embodiment is a WDM communication system including a transmission equipment 2110, optical repeaters 2121 to 2124, a receiving equipment 2130, an NMS 2140, and the optical power measurement apparatus 100.

The transmission equipment 2110 includes transmitters 2111a to 2111d, variable optical attenuators 2112a to 2112d, and a multiplexer 2113. The transmitters 2111a to 2111d output optical signals having wavelengths different from each other to the respective variable optical attenuators 2112a to 2112d.

The variable optical attenuators (VOAs) 2112a to 2112d attenuate the optical signals outputted from the respective transmitters 2111a to 2111d by variable amounts of attenuation and output the attenuated optical signals to the multiplexer 2113. The multiplexer 2113 multiplexes the optical signals outputted from the variable optical attenuators 2112a to 2112d and transmits the multiplexed optical signal to the receiving equipment 2130.

The optical repeaters 2121 to 2124 repeat the optical signal transmitted from the transmission equipment 2110 to the receiving equipment 2130. The optical repeaters 2121 to 2124 are, for example, formed of optical amplifiers. The optical repeaters 2121 to 2124 formed of optical amplifiers amplify the repeated optical signal as appropriate.

The receiving equipment 2130 includes a demultiplexer 2131 and receivers 2132a to 2132d. The demultiplexer 2131 demultiplexes the optical signal received from the transmission equipment 2110 through the optical repeaters 2121 to 2124 into a plurality of optical signals having wavelengths different from each other and outputs the demultiplexed optical signals to the receivers 2132a to 2132d. The receivers 2132a to 2132d receive the optical signals outputted from the demultiplexer 2131.

The NMS 2140 monitors and controls communication in the communication system 2100. For example, the NMS 2140 monitors each WDM-transmitted optical signal in the communication system 2100 and transmits information on the optical signal to the optical power measurement apparatus 100. The NMS 2140 also controls each WDM-transmitted optical signal in the communication system 2100 and transmits information on the optical signal to the optical power measurement apparatus 100.

The optical signal to be received by the receiving equipment 2130 is split by an optical coupler 2150, and the spectrum data acquisition section 104 in the optical power measurement apparatus 100 according to the invention receives the split optical signal and acquires the optical spectrum of the received optical signal. The signal information acquisition section 101 in the optical power measurement apparatus 100 receives information on the optical signal transmitted from the NMS 2140. In this way, the optical power measurement apparatus 100 can measure the power of the optical signal received by the receiving equipment 2130 also in the WDM communication system.

Figure 22:
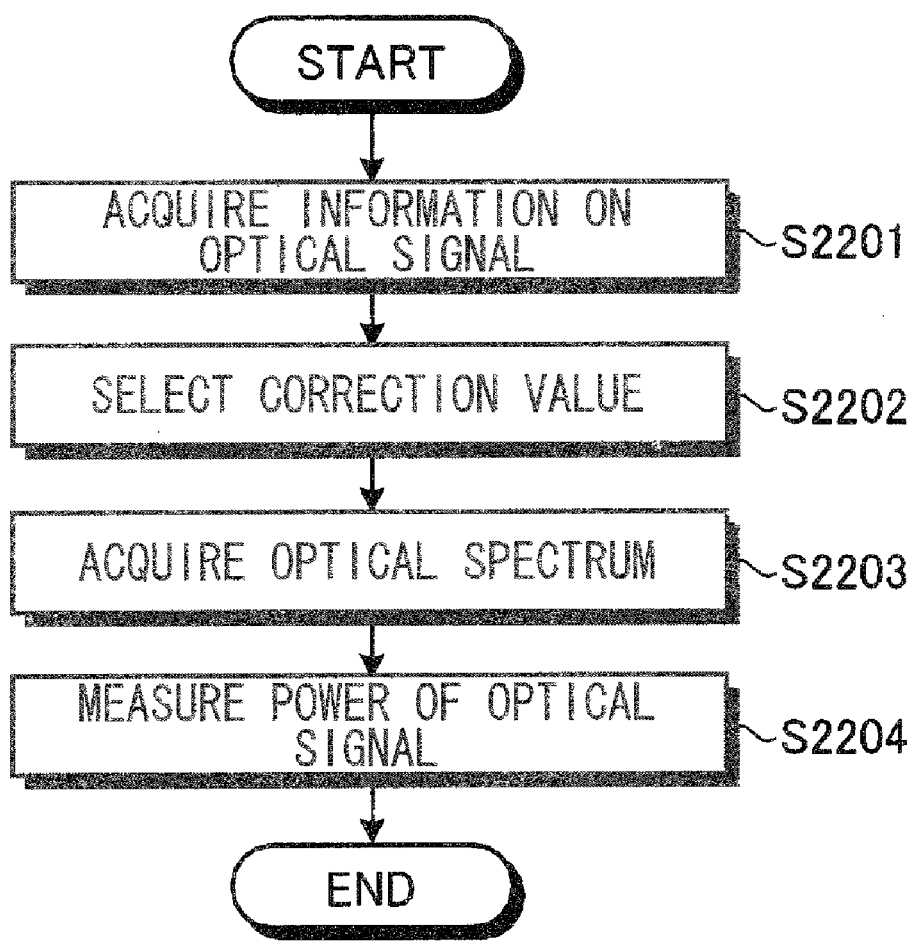
FIG. 22 is an example of the flowchart showing the operation of the optical power measurement apparatus according to the third embodiment.

FIG. 22 is an example of the flowchart showing the operation of the optical power measurement apparatus according to an embodiment. As shown in FIG. 22, in the optical power measurement apparatus 100 according to an embodiment, the signal information acquisition section 101 first acquires the information on the WDM-transmitted optical signal from the NMS 2140 (the step S2201). Then, the selection section 103 selects the correction value corresponding to the information on the optical signal acquired in the step S2201 from the table stored in the storage section 102 (the step S2202).

Then, the spectrum data acquisition section 104 acquires the optical spectrum of the optical signal split from the optical coupler 2150 (the step S2203). Next, the measurement section 105 measures the power of the optical signal by calculating the power of the optical signal based on the optical spectrum of the optical signal acquired in the step S2203 and the correction value selected in the step S2202 (the step S2204). At this point, the series of steps are completed.

As described above, in the communication system 2100 to which the optical power measurement apparatus 100 according to an is applied, the signal information acquisition section 101 acquires the information on the optical signal from the NMS 2140, and the selection section 103 can select the correction value based on the information on the optical signal. It is therefore possible to accurately measure the power of the optical signal also in the WDM communication system.

The order of the operations of the optical power measurement apparatus 100 is not limited to that described above. For example, the optical power measurement apparatus 100 may first acquire the optical spectrum of the optical signal (the step S2203 described above), then acquire the information on the optical signal (the step S2201 described above), select the correction value (the step S2202 described above), and measure the power of the optical signal (the step S2204 described above).

Figure 23:
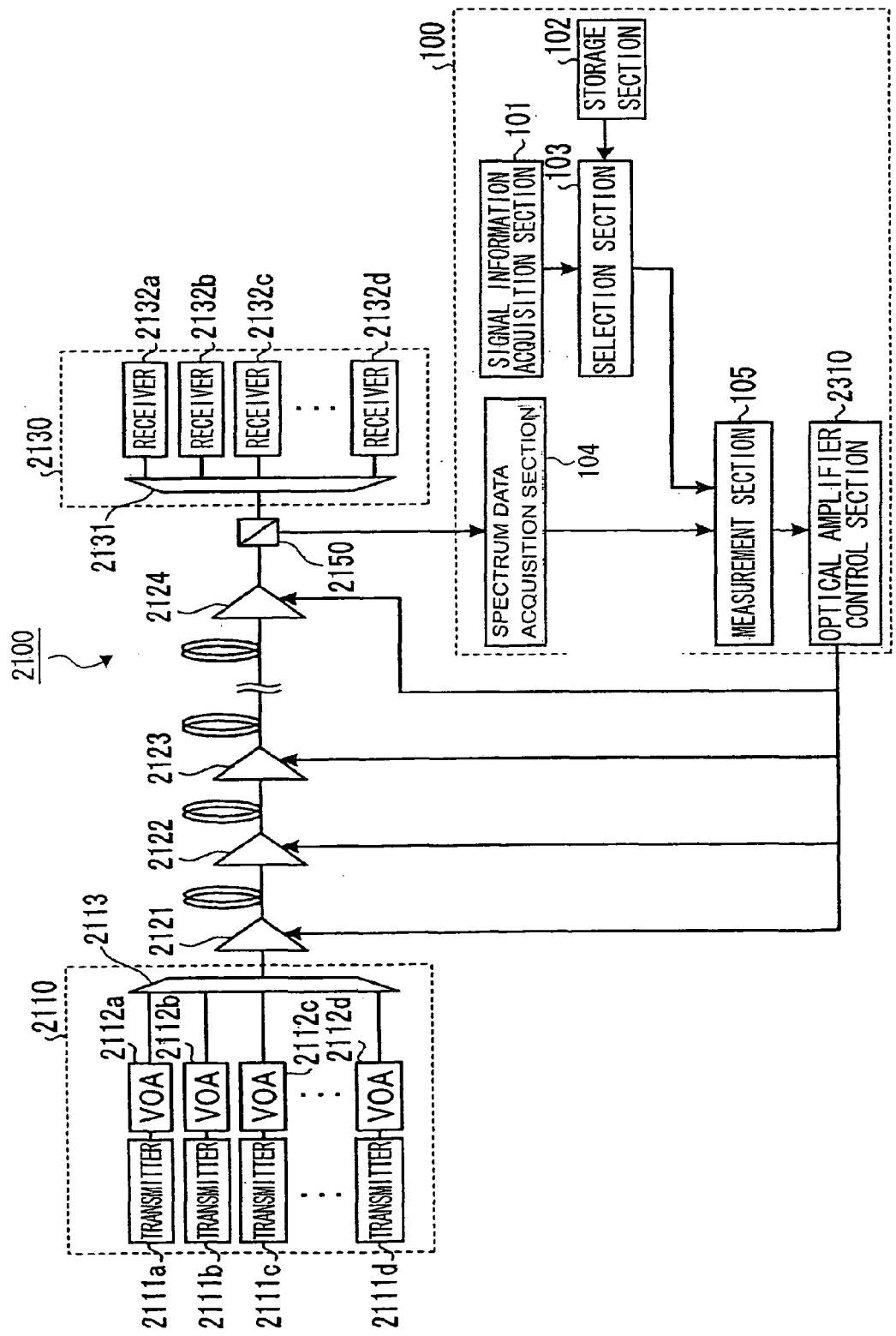
FIG. 23 is a block diagram showing an example of the configuration of a communication system to which the optical power measurement apparatus according to a fourth embodiment is applied.

FIG. 23 is a block diagram showing an example of the configuration of a communication system to which the optical power measurement apparatus according to an embodiment is applied. In FIG. 23, the configurations similar to those in FIG. 21 have the same reference characters and the description thereof will be omitted. As shown in FIG. 23, the optical power measurement apparatus 100 according to an embodiment includes an optical amplifier control section 2310 as well as the configurations in the above embodiments. The measurement section 105 outputs information on the measured power of the optical signal to the optical amplifier control section 2310.

The optical amplifier control section 2310 transmits information on the power of the optical signal outputted from the measurement section 105 to the optical repeaters 2121 to 2124. The optical amplifier control section 2310 thus controls the amount of amplification of the optical signal performed by the optical amplifiers that form the optical repeaters 2121 to 2124. The information on the power of the optical signal may simply be the information on the power of the optical signal, or may be control information for the optical amplifiers in the optical repeaters 2121 to 2124 calculated from the information on the power of the optical signal.

As described above, in the communication system 2100 to which the optical power measurement apparatus 100 according to an embodiment is applied, the optical amplifier control section 2310 can control the amount of amplification of the optical signal performed by the optical repeaters 2121 to 2124 based on the power of the optical signal accurately measured by the measurement section 105. It is therefore possible to accurately control the amount of amplification of the optical signal performed by the optical repeaters 2121 to 2124 also in the WDM communication system.

Figure 24:
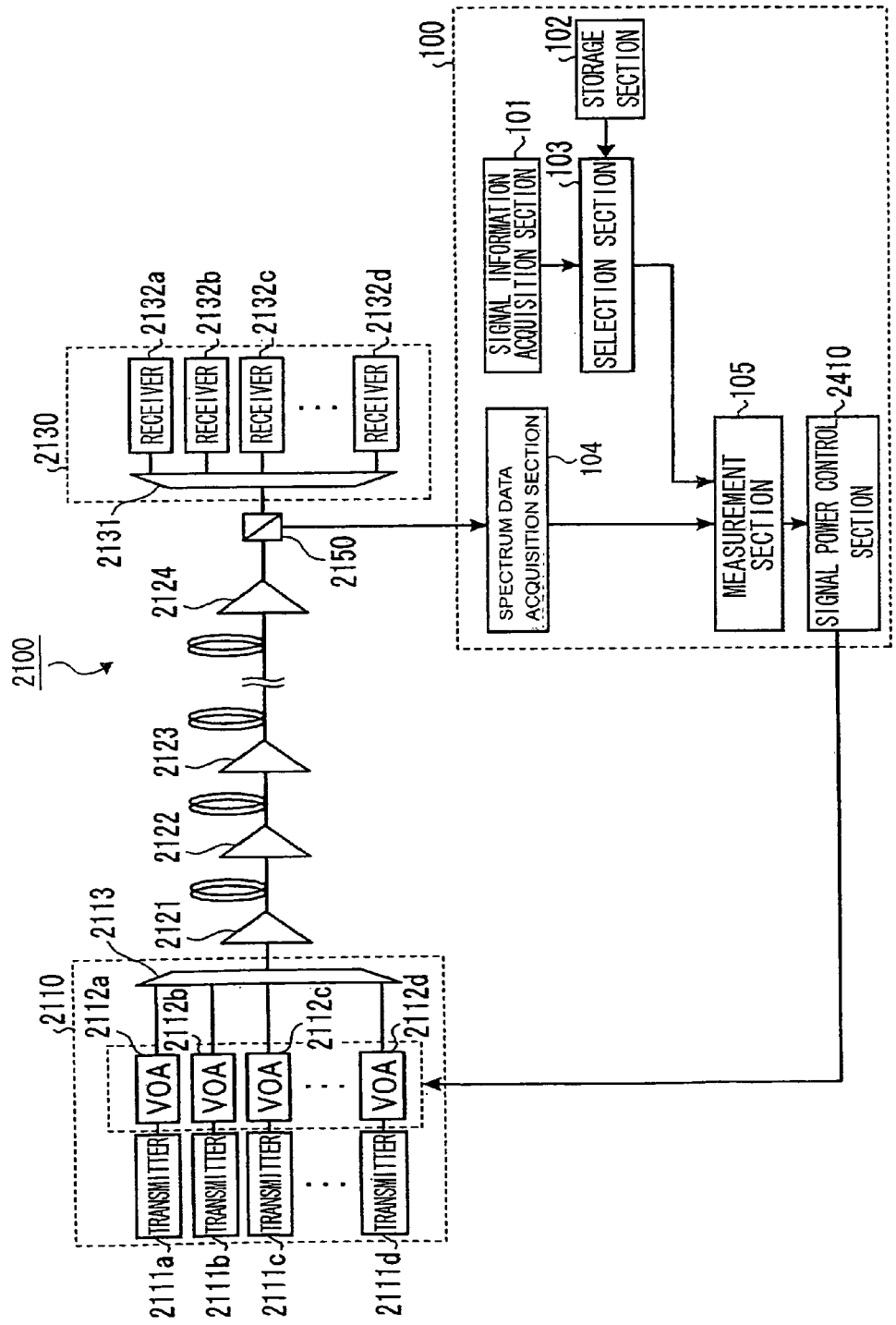
FIG. 24 is a block diagram showing an example of the configuration of a communication system to which the optical power measurement apparatus according to a fifth embodiment is applied.

FIG. 24 is a block diagram showing an example of the configuration of a communication system to which the optical power measurement apparatus according to an embodiment is applied. In FIG. 24, the configurations similar to those in FIG. 21 have the same reference characters and the description thereof will be omitted. As shown in FIG. 24, the optical power measurement apparatus 100 according to an embodiment includes a signal power control section 2410 as well as the configurations in the above embodiments. The measurement section 105 outputs information on the measured power of the optical signal to the signal power control section 2410.

The signal power control section 2410 transmits information on the power of the optical signal outputted from the measurement section 105 to the transmission equipment 2110. The signal power control section 2410 thus controls the power of the optical signal transmitted by the transmission equipment 2110. The information on the power of the optical signal may simply be the information on the power of the optical signal, or may be control information for the variable optical attenuators 2112a to 2112d in the transmission equipment 2110 calculated from the information on the power of the optical signal.

The transmission equipment 2110 controls the amounts of attenuation of the optical signals performed by the variable optical attenuators 2112a to 2112d based on the information on the power of the optical signal transmitted from the signal power control section 2410 so as to make the powers of the optical signals outputted from the transmitters 2111a to 2111d same level or make the powers of the optical signals to be inputted to the receivers 2132a to 2132d same level. In addition, the transmission equipment 2110 thus makes the OSNR same level (pre-emphasis) by separately determining the optical noise level through actual measurement or computation.

As described above, in the communication system 2100 to which the optical power measurement apparatus 100 according to an embodiment is applied, the signal power control section 2410 can control the variable optical attenuators 2112a to 2112d in the transmission equipment 2110 based on the power of the optical signal accurately measured by the measurement section 105. It is therefore possible to accurately make the powers of the optical signals outputted from the transmitters 2111a to 2111d in the transmission equipment 2110 same level or make the powers of the optical signals to be inputted to the receivers 2132a to 2132d in the receiving equipment 2130 same level also in the WDM communication system. It is also possible to make the OSNR same level by separately determining the optical noise level through actual measurement or computation.

Figure 25:
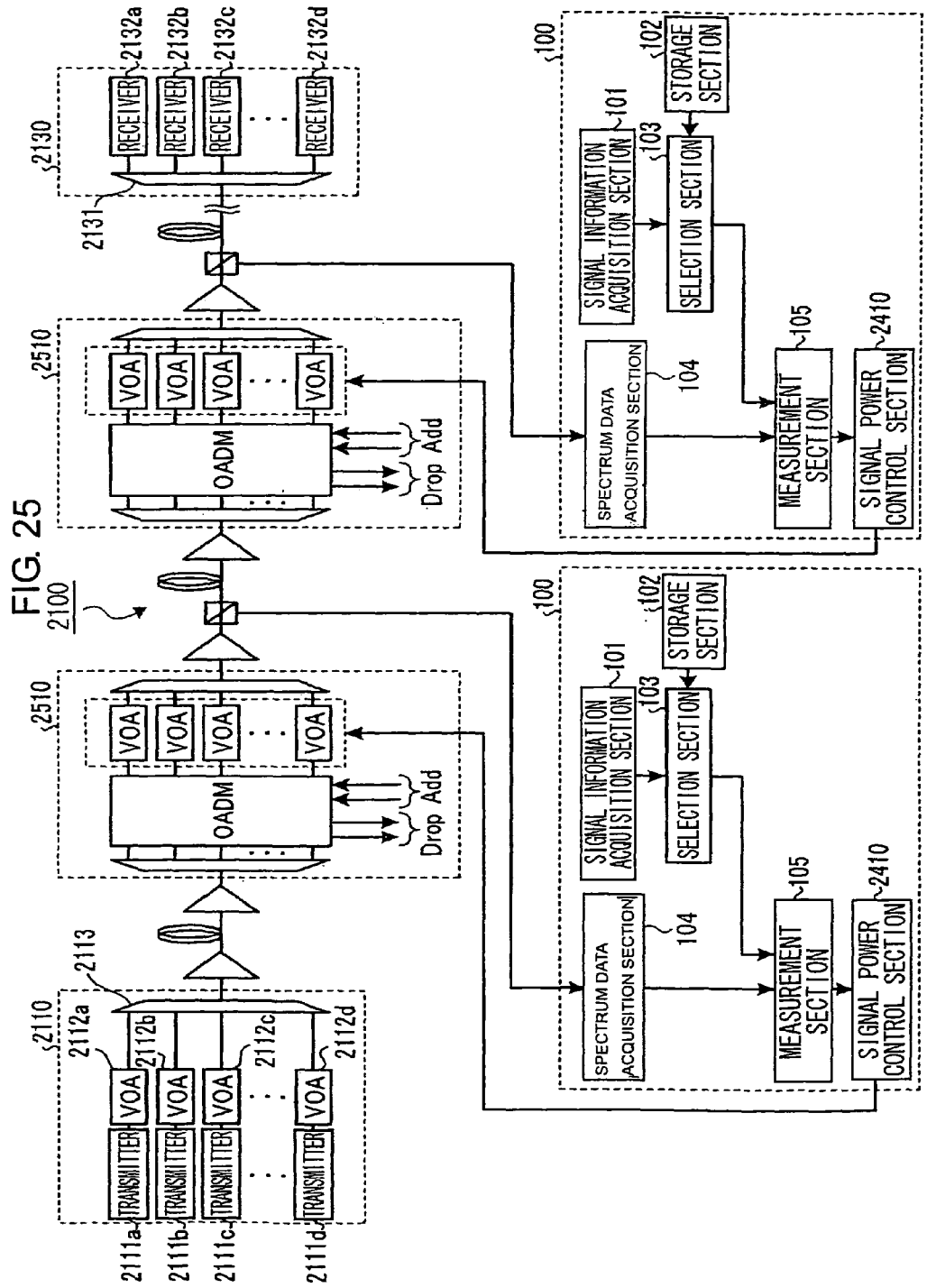
FIG. 25 is a block diagram showing an example of the configuration of a communication system to which the optical power measurement apparatus according to a sixth embodiment is applied.

FIG. 25 is a block diagram showing an example of the configuration of a communication system to which the optical power measurement apparatus according to an embodiment is applied. In FIG. 25, the configurations similar to those in FIG. 21 have the same reference characters and the description thereof will be omitted. As shown in FIG. 25, the communication system 2100 to which the optical power measurement apparatus 100 according to an embodiment is applied includes an OADM (Optical Add Drop Multiplexer) node 2510 as a optical repeater. In this embodiment, there are provided a plurality of OADM nodes 2510.

The OADM node 2510 adds optical signals from other transmission paths to the optical signals transmitted from the transmission equipment 2110 to the receiving equipment 2130, or drops optical signals in some channels from the optical signals transmitted from the transmission equipment 2110 to the receiving equipment 2130 and transmits the dropped optical signals to other transmission paths. The optical power measurement apparatus 100 according to an embodiment includes the signal power control section 2410 as in the optical power measurement apparatus 100 according to the previous embodiment.

The measurement section 105 outputs the information on the measured power of the optical signal to the signal power control section 2410. The signal power control section 2410 transmits information on the power of the optical signal outputted from the measurement section 105 to the OADM node 2510. The signal power control section 2410 thus controls the power of the optical signal transmitted by the OADM node 2510.

The information on the power of the optical signal may simply be the information on the power of the optical signal, or may be power control information in the transmission equipment 2110 calculated from the information on the power of the optical signal. The OADM node 2510 performs Add, Through and Drop based on the information on the power of the optical signal transmitted from the signal power control section 2410. As a result, the powers or OSNRs of the optical signals in the channels transmitted from the OADM node 2510 are made same level, or the powers or OSNRs of the optical signals to be inputted to the receivers 2132a to 2132d are made same level (pre-emphasis).

Figure 26:
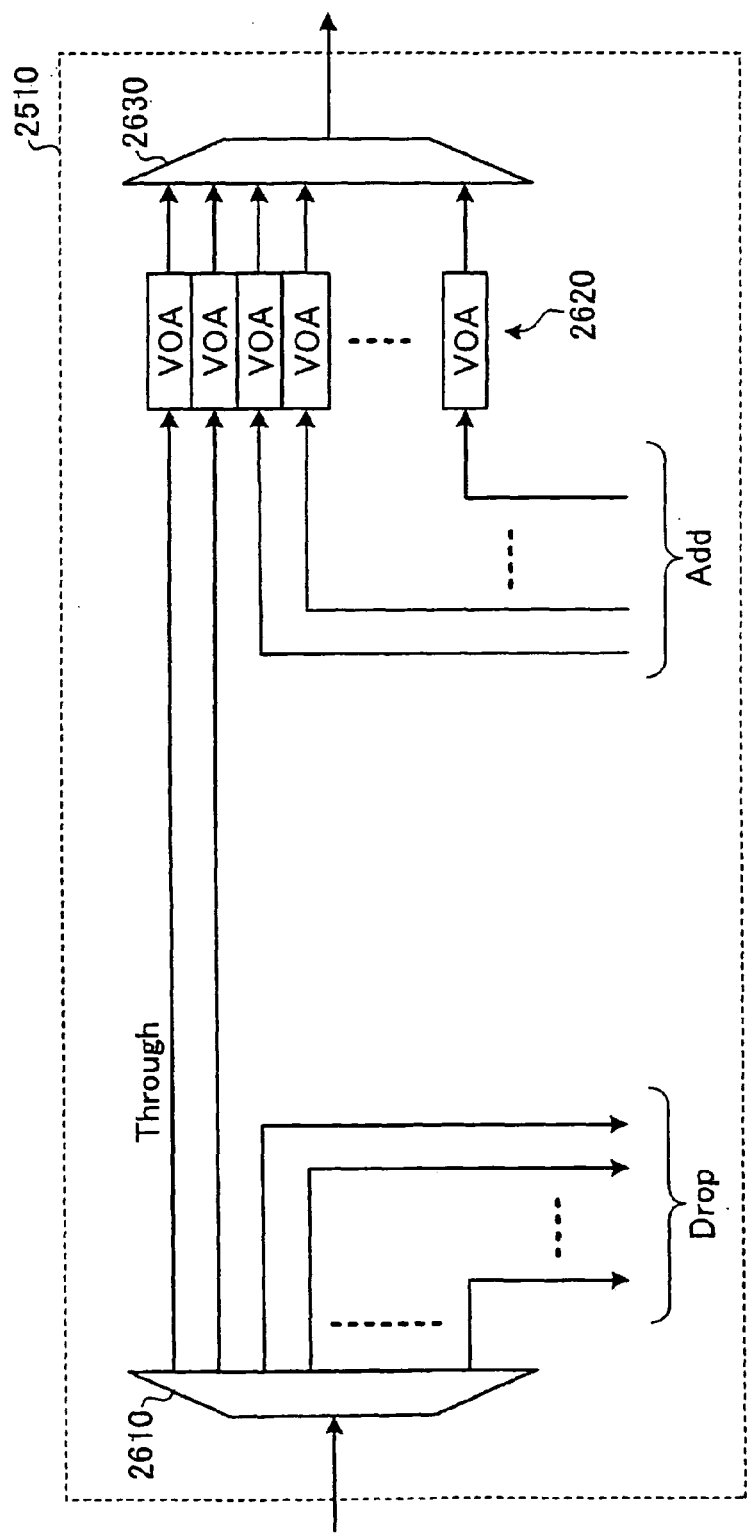
FIG. 26 is a block diagram showing an example of a specific configuration of the OADM node in FIG. 25.

FIG. 26 is a block diagram showing an example of a specific configuration of the OADM node in FIG. 25. As shown in FIG. 26, the OADM node 2510 includes a demultiplexer 2610, a plurality of variable optical attenuators 2620, and a multiplexer 2630. The demultiplexer 2610 demultiplexes the optical signal transmitted from the transmission equipment 2110, outputs the demultiplexed optical signals in respective channels to the variable optical attenuators 2620, or drops part of the demultiplexed optical signals and transmits them to other transmission paths.

The variable optical attenuators 2620 output the optical signals outputted from the demultiplexer 2610 to the multiplexer 2630 (Through). Alternatively, some of the variable optical attenuators 2620 may add optical signals transmitted from other transmission paths to the optical signals outputted from the demultiplexer 2610 and output them to the multiplexer (Add).

The multiplexer 2630 multiplexes the optical signals outputted from the variable optical attenuators 2620 and transmits the multiplexed optical signal to the receiving equipment 2130. The OADM node 2510 controls the amounts of attenuation of the optical signals performed by the variable optical attenuators 2620 based on the information on the power of the optical signal transmitted from the optical power measurement apparatus 100 so as to make the powers or OSNRs of the optical signals in the channels to be transmitted from the OADM node 2510 same level, or make the powers or OSNRs of the optical signals to be inputted to the receivers 2132a to 2132d same level (pre-emphasis).

Figure 27:
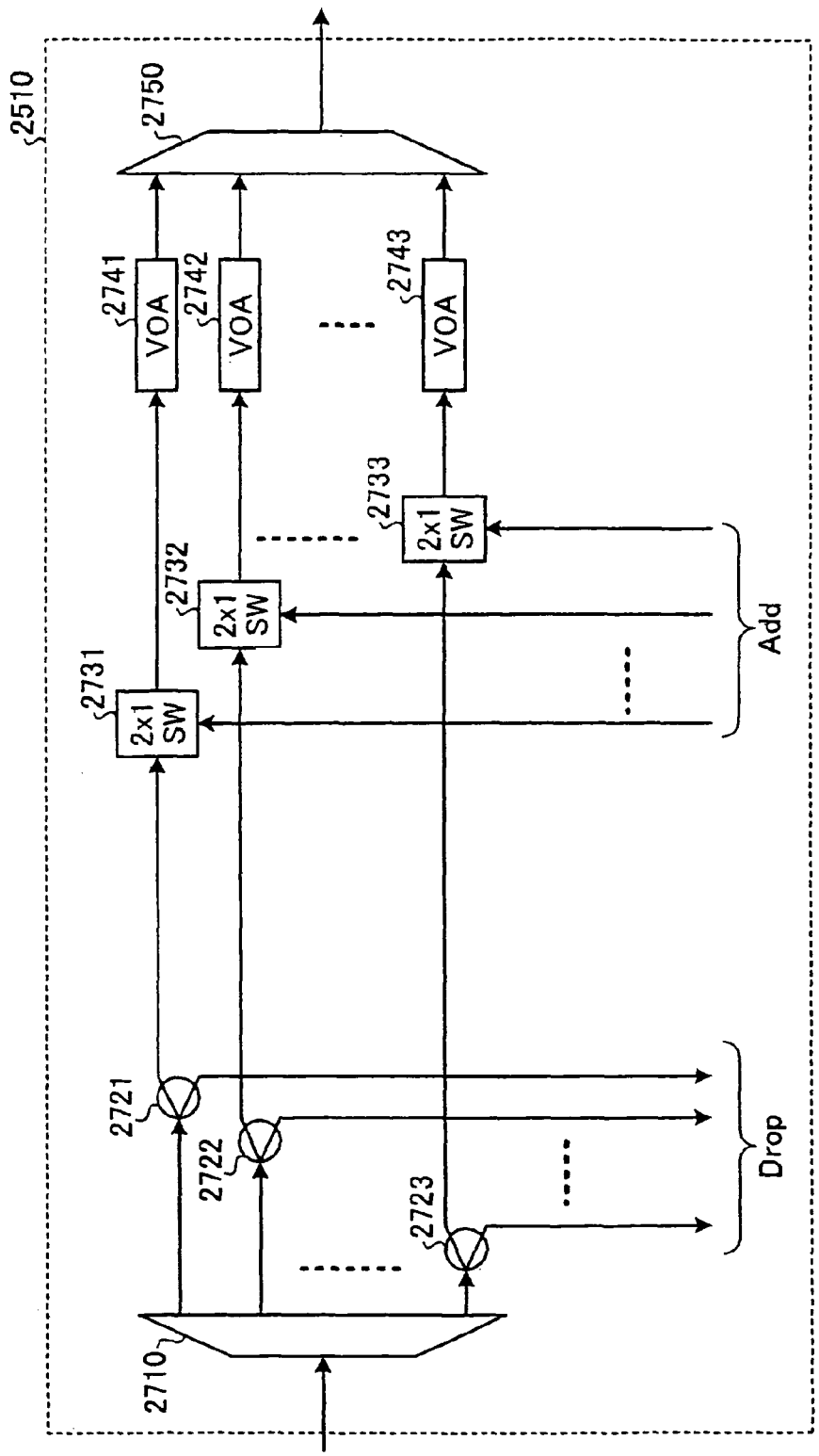
FIG. 27 is a block diagram showing an example of another specific configuration of the OADM node in FIG. 25.

FIG. 27 is a block diagram showing an example of another specific configuration of the OADM node in FIG. 25. As shown in FIG. 27, the jOADM node 2510 may include a demultiplexer 2710, optical couplers 2721 to 2723, optical switches 2731 to 2733, variable optical attenuators 2741 to 2743, and a multiplexer 2750. The OADM node 2510 in this case is a reconfigurable OADM node capable of switching between Add ports and Drop ports.

The demultiplexer 2710 demultiplexes the optical signal transmitted from the transmission equipment 2110, and outputs the demultiplexed optical signals in respective channels to the optical couplers 2721 to 2723. Each of the optical couplers 2721 to 2723 splits the optical signal in each of the channels outputted from the demultiplexer 2710, outputs one of the split optical signals to the corresponding one of the optical switches 2731 to 2733, and drops the other split optical signal and transmits it to another transmission path. The optical switches 2731 to 2733 receive the optical signals outputted from the optical couplers 2721 to 2723 and optical signals transmitted from other transmission paths.

The optical switches 2731 to 2733 output either the optical signals outputted from the optical couplers 2721 to 2723 or the optical signals transmitted from the other transmission paths to the respective variable optical attenuators 2741 to 2743. When the optical switches 2731 to 2733 output the optical signals outputted from the optical couplers 2721 to 2723, the optical signal transmitted from the transmission equipment 2110 is transmitted "through" the receiver equipment 2130.

When the optical switches 2731 to 2733 output the optical signals transmitted from the other transmission paths, the optical signal transmitted from the transmission equipment 2110 is "dropped", and the optical signals transmitted from the other transmission paths are "added" and transmitted to the receiving equipment 2130. The variable optical attenuators 2741 to 2743 output the optical signals outputted from the respective optical switches 2731 to 2733 to the multiplexer 2750.

The multiplexer 2750 multiplexes the optical signals outputted from the variable optical attenuators 2741 to 2743 and transmits the multiplexed optical signal to the receiving equipment 2130. The OADM node 2510 controls the amounts of attenuation of the optical signals performed by the respective variable optical attenuators 2741 to 2743 based on the information on the power of the optical signal transmitted from the optical power measurement apparatus 100, and makes the powers or OSNRs of the optical signals in the channels to be transmitted from the OADM node 2510 same level or makes the powers or OSNRs of the optical signals to be inputted to the receivers 2132a to 2132d same level (pre-emphasis).

As described above, in the communication system 2100 to which the optical power measurement apparatus 100 according to an embodiment is applied, the signal power control section 2410 can control the OADM node 2510 based on the power of the optical signal accurately measured by the measurement section 105. It is therefore possible to accurately make the powers of the optical signals to be outputted from the OADM node 2510 same level also in the WDM communication system.

Figure 28:
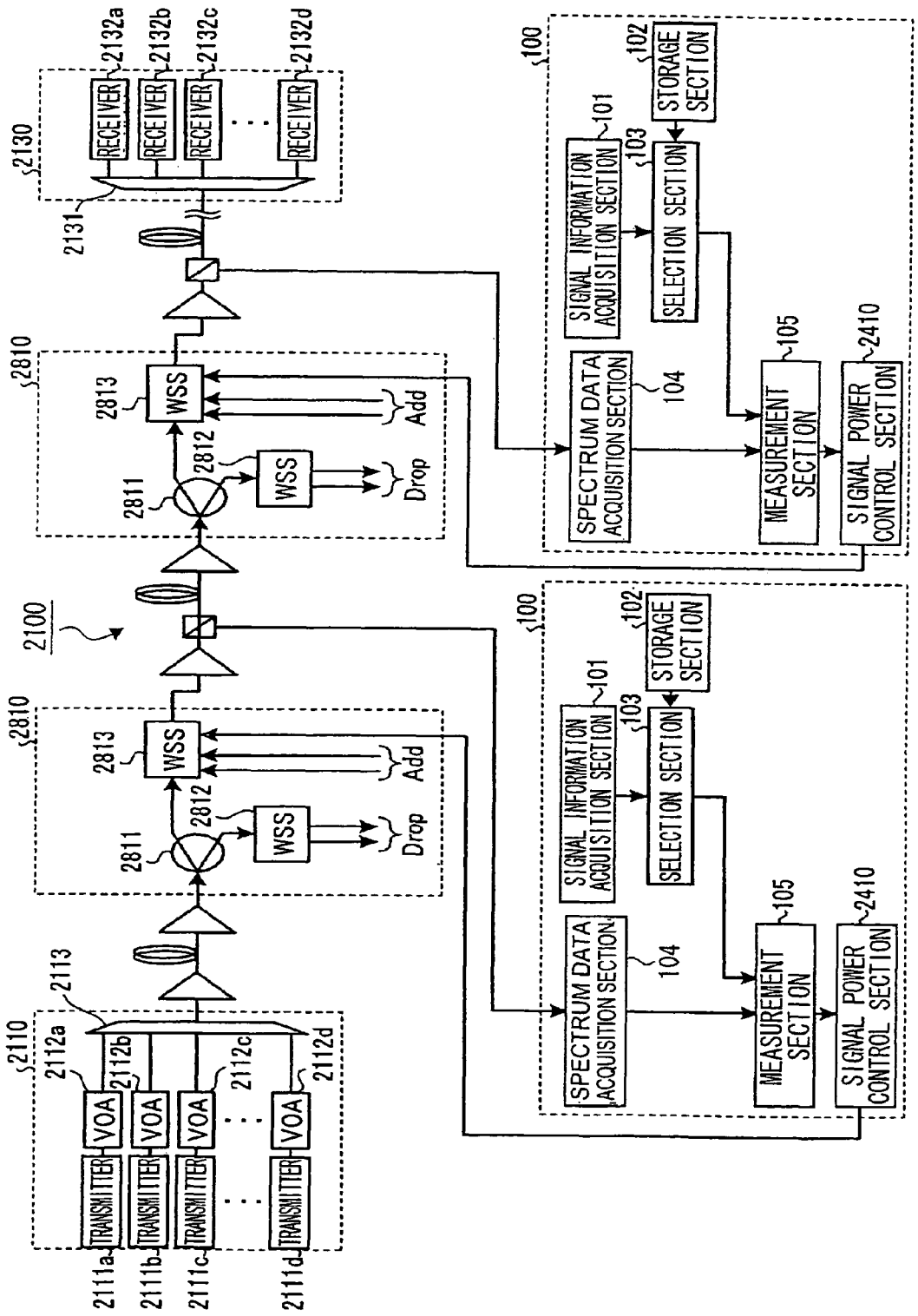
FIG. 28 is a block diagram showing an example of the configuration of a communication system to which the optical power measurement apparatus according to a seventh embodiment is applied.

FIG. 28 is a block diagram showing an example of the configuration of a communication system to which the optical power measurement apparatus according to an embodiment is applied. In FIG. 28, the configurations similar to those in FIG. 21 have the same reference characters and the description thereof will be omitted. As shown in FIG. 28, the communication system 2100 to which the optical power measurement apparatus 100 according to an embodiment is applied includes DOADM (Dynamic OADM) nodes 2810 as optical repeaters. The DOADM node 2810 is an OADM node capable of switching Add and Drop according to the wavelength.

The DOADM node 2810, as in the OADM node 2510 according to the previous embodiment, adds optical signals from other transmission paths to the optical signal transmitted from the transmission equipment 2110 to the receiving equipment 2130, or drops optical signals in some channels from the optical signals transmitted from the transmission equipment 2110 to the receiving equipment 2130 and transmits the dropped optical signals to other transmission paths. The optical power measurement apparatus 100 according to an embodiment includes the signal power control sections 2410 as in the optical power measurement apparatus 100 according to the fifth embodiment.

The measurement section 105 outputs information on the measured power of the optical signal to the signal power control section 2410. The signal power control section 2410 transmits information on the power of the optical signal outputted from the measurement section 105 to the DOADM node 2810. The signal power control section 2410 thus controls the power of the optical signal transmitted by the DOADM node 2810.

The DOADM node 2810 includes an optical coupler 2811 and wavelength selectable switches (WSS) 2812 and 2813. The optical coupler 2811 splits the optical signal transmitted from the transmission equipment 2110, outputs one of the split optical signals to the WSS 2812, and outputs the other split optical signal to the WSS 2813. The WSS 2812 drops only optical signals having predetermined wavelengths from the optical signals outputted from the optical coupler 2811 (Drop) and transmits the dropped optical signals to other transmission paths.

The WSS 2813 transmits only optical signals having predetermined wavelengths from the optical signals outputted from the optical coupler 2811. Furthermore, the WSS 2813 adds only optical signals having predetermined wavelengths from optical signals transmitted from other transmission paths to the optical signal outputted from the optical coupler 2811 and transmits the resultant optical signal to the receiving equipment 2130.

Each of the WSS 2812 and WSS 2813 has a function to control the power of the optical signal to be outputted. The DOADM node 2810 controls the WSS 2812 and WSS 2813 based on the information on the information on the power of the optical signal transmitted from the signal power control section 2410, and makes the powers or OSNRs of the optical signals that have undergone Add, Through and Drop and are then transmitted from the OADM node 2510 same level, or makes the powers or OSNRs of such optical signals to be inputted to the receivers 2132a to 2132d same level (pre-emphasis).

As described above, in the communication system 2100 to which the optical power measurement apparatus 100 according to an embodiment is applied, the signal power control section 2410 can control the DOADM node 2810 based on the power of the optical signal accurately measured by the measurement section 105. It is therefore possible to accurately make the powers of the optical signals outputted from the DOADM node 2810 same level also in the WDM communication system.

As described above, the optical power measurement apparatus and the optical power measurement method according to the invention can accurately measure the power of an optical signal also in a WDM communication system. In particular, even when the bit rate of the optical signal is high or the difference between the wavelength in one channel and that in the adjacent channel is small so that the spectrum of the optical signal in the channel to be measured is mixed with the components of the optical signals in the adjacent channels, the corresponding correction value stored in a table allows accurate measurement of the power of the optical signal in the channel to be measured.

Furthermore, it is possible to accurately control the amount of amplification of an optical signal performed by the optical repeater also in the WDM communication system. It is also possible to accurately make the powers of optical signals outputted from the transmission equipment same level also in the WDM communication system. Moreover, it is possible to accurately make the powers of optical signals outputted from the OADM node same level also in the WDM communication system. It is also possible to accurately make the powers of optical signals outputted from the DOADM node same level also in the WDM communication system.

In the embodiments described above, although the signal information acquisition section 101 is configured to acquire information on an optical signal from the NMS, the signal information acquisition section 101 may acquire information on the optical spectrum from the spectrum data acquisition section 104 to predict the information on the optical signal. In this way, the optical power measurement apparatus 100 can accurately measure the power of the optical signal without receiving any information on the optical signal from the NMS.

Although a few preferred embodiments have been shown and described, it would be appreciated by those skilled in the art that changes may be made in these embodiments without departing from the principles and spirit of the invention, the scope of which is defined in the claims and their equivalents.

What is claimed is:

1. An apparatus, comprising:
an information acquisition section that acquires information on an optical signal transmitted in a wavelength multiplexing scheme;
a spectrum data acquisition section that acquires an optical spectrum of the optical signal;
a storage section that stores correction values for the power of the optical signal corresponding to the information on the optical signal, a stored correction value being a negative value when a wavelength resolution used in the spectrum data acquisition section is larger than an optical spectral width of the optical signal and a positive value when a wavelength resolution used in the spectrum data acquisition section is smaller than an optical spectral width of the optical signal; and
a measurement section that measures power of the optical signal based on the optical spectrum and a correction value acquired from the storage section.

2. An apparatus, comprising:
an information acquisition section that acquires information on an optical signal transmitted in a wavelength multiplexing scheme;
a storage section that stores correction values for the power of the optical signal corresponding to the information on the optical signal;
a selection section that selects from the storage section a correction value corresponding to the information on the optical signal acquired by the information acquisition section;
a spectrum data acquisition section that acquires an optical spectrum of the optical signal; and
a measurement section that measures the power of the optical signal by calculating the power of the optical signal based on the optical spectrum and the correction value selected by the selection section,
a correction value stored in the storage section is a negative value when a wavelength resolution used in the spectrum data acquisition section is larger than an optical spectral width of the optical signal.

3. The apparatus according to claim 2,
wherein the spectrum data acquisition section acquires the optical spectrum at a wavelength resolution according to the information on the optical signal acquired by the information acquisition section.

4. The optical power measurement apparatus according to claim 2,
wherein the information acquisition section acquires the information on the optical signal from a network management system (NMS).

5. The apparatus according to claim 2, further comprising an amplification control section that transmits information on the power of the optical signal measured by the measurement section to a optical repeater that amplifies an optical signal on a network and controls an amount of amplification of the optical signal performed by the optical repeater.

6. An apparatus, comprising:
an information acquisition section that acquires information on an optical signal transmitted in a wavelength multiplexing scheme;
a storage section that stores correction values for the power of the optical signal corresponding to the information on the optical signal;
a selection section that selects from the storage section a correction value corresponding to the information on the optical signal acquired by the information acquisition section;
a spectrum data acquisition section that acquires an optical spectrum of the optical signal; and
a measurement section that measures the power of the optical signal by calculating the power of the optical signal based on the optical spectrum and the correction value selected by the selection section,
a correction value stored in the storage section is a positive value when a wavelength resolution used in the spectrum data acquisition section is smaller than an optical spectral width of the optical signal.

7. The apparatus according to claim 6,
wherein the spectrum data acquisition section acquires the optical spectrum at a wavelength resolution according to the information on the optical signal acquired by the information acquisition section.

8. The optical power measurement apparatus according to claim 6,
wherein the information acquisition section acquires the information on the optical signal from a network management system (NMS).

9. The apparatus according to claim 6, further comprising an amplification control section that transmits information on the power of the optical signal measured by the measurement section to a optical repeater that amplifies an optical signal on a network and controls an amount of amplification of the optical signal performed by the optical repeater.

10. An apparatus, comprising:
an information acquisition section that acquires information on an optical signal transmitted in a wavelength multiplexing scheme;
a storage section that stores correction values for the power of the optical signal corresponding to the information on the optical signal;
a selection section that selects from the storage section a correction value corresponding to the information on the optical signal acquired by the information acquisition section;
a spectrum data acquisition section that acquires an optical spectrum of the optical signal; and
a measurement section that measures the power of the optical signal by calculating the power of the optical signal based on the optical spectrum and the correction value selected by the selection section, wherein the information acquisition section acquires information on an adjacent optical signal having a wavelength adjacent to that of the optical signal as the information on the optical signal.

11. The apparatus according to claim 10, wherein the information acquisition section acquires information on whether or not there is an adjacent optical signal as the information on the optical signal.

12. The apparatus according to claim 10, wherein the information acquisition section acquires information on a bit rate of the adjacent optical signal as the information on the optical signal.

13. The apparatus according to claim 10, wherein the information acquisition section acquires information on a modulation format for the adjacent optical signal as the information on the optical signal.

14. An apparatus, comprising:
an information acquisition section that acquires information on an optical signal transmitted in a wavelength multiplexing scheme;
a storage section that stores correction values for the power of the optical signal corresponding to the information on the optical signal;
a selection section that selects from the storage section a correction value corresponding to the information on the optical signal acquired by the information acquisition section;
a spectrum data acquisition section that acquires an optical spectrum of the optical signal; and
a measurement section that measures the power of the optical signal by calculating the power of the optical signal based on the optical spectrum and the correction value selected by the selection section; and
a power control section that transmits information on the power of the optical signal measured by the measurement section to a transmission equipment that transmits the optical signal and controls the transmission equipment in such a way that the powers of optical signals in respective channels transmitted by the transmission equipment are made same level.

15. The apparatus according to claim 14 further comprising a second power control section that transmits information on the power of the optical signal measured by the measurement section to an OADM node that repeats an optical signal on a network and controls the OADM node in such a way that the powers of optical signals in respective channels transmitted by the OADM node are made same level.

16. A method comprising:
acquiring information on an optical signal transmitted in a wavelength multiplexing scheme;
selecting, from a storage apparatus containing correction values for the power of the optical signal corresponding to the information on the optical signal, a correction value corresponding to the information on the optical signal acquired in the signal information acquiring;
acquiring, via a spectrum acquisition apparatus, an optical spectrum of the optical signal; and
measuring the power of the optical signal by calculating the power of the optical signal based on the optical spectrum and the correction value selected in the selecting,
wherein a correction value in the storage apparatus is a negative value when a wavelength resolution used in the spectrum data acquisition is larger than an optical spectral width of the optical signal.

17. The method according to claim 16, wherein in the spectrum data acquiring, the optical spectrum is acquired at a wavelength resolution according to the information on the optical signal acquired in the signal information acquiring.

18. A method comprising:
acquiring information on an optical signal transmitted in a wavelength multiplexing scheme;
selecting, from a storage apparatus containing correction values for the power of the optical signal corresponding to the information on the optical signal, a correction value corresponding to the information on the optical signal acquired in the signal information acquiring;
acquiring, via a spectrum acquisition apparatus, an optical spectrum of the optical signal; and
measuring the power of the optical signal by calculating the power of the optical signal based on the optical spectrum and the correction value selected in the selecting,
wherein a correction value in the storage apparatus is a positive value when a wavelength resolution used in the spectrum data acquisition is smaller than an optical spectral width of the optical signal.

19. The method according to claim 18, wherein in the spectrum data acquiring, the optical spectrum is acquired at a wavelength resolution according to the information on the optical signal acquired in the signal information acquiring.

* * * * *